(12) United States Patent
Takano

(10) Patent No.: US 9,340,249 B2
(45) Date of Patent: May 17, 2016

(54) VEHICLE

(71) Applicant: Yamaha Hatsudoki Kabushiki Kaisha, Iwata-shi, Shizuoka (JP)

(72) Inventor: Kazuhisa Takano, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 0 days.

(21) Appl. No.: 14/652,835

(22) PCT Filed: Dec. 19, 2013

(86) PCT No.: PCT/JP2013/084149
§ 371 (c)(1),
(2) Date: Jun. 17, 2015

(87) PCT Pub. No.: WO2014/098199
PCT Pub. Date: Jun. 26, 2014

(65) Prior Publication Data
US 2015/0314827 A1    Nov. 5, 2015

(30) Foreign Application Priority Data

Dec. 19, 2012 (JP) ................................ 2012-277219
Dec. 19, 2012 (JP) ................................ 2012-277220

(51) Int. Cl.
*B62K 5/08* (2006.01)
*B62K 5/10* (2013.01)
(Continued)

(52) U.S. Cl.
CPC . *B62K 5/08* (2013.01); *B62K 5/027* (2013.01); *B62K 5/05* (2013.01); *B62K 5/10* (2013.01); *B62K 21/00* (2013.01); *B62K 25/08* (2013.01); *B62K 2202/00* (2013.01)

(58) Field of Classification Search
CPC .................................. B62K 5/027; B62K 5/05
USPC .......................................... 180/210, 216, 217
See application file for complete search history.

(56) References Cited

U.S. PATENT DOCUMENTS 4,740,004 A * 4/1988 McMullen ............... B62K 5/05
                                                    280/124.103
D547,242 S     7/2007 Lambri
(Continued)

FOREIGN PATENT DOCUMENTS

EP       1 155 950 A2    11/2001
EP       2 399 811 A1    12/2011
(Continued)

OTHER PUBLICATIONS

Official Communication issued in International Patent Application No. PCT/JP2013/084149, mailed on Apr. 1, 2014.
(Continued)

Primary Examiner — Kevin Hurley
(74) Attorney, Agent, or Firm — Keating and Bennett, LLP

(57) ABSTRACT

A vehicle includes a vehicle body frame that can lean, a right front wheel and a left front wheel, and an upper cross portion and a lower cross portion of a link mechanism each including a right end portion, a left end portion, and a middle portion supported on the vehicle body frame. The upper cross portion and the lower cross portion have different shapes. An upper right displacement and an upper left displacement that result when a rearward test force is exerted on an upper right bearing and an upper left bearing that support the upper cross portion with the lower cross portion removed are equal or substantially equal, and a lower right displacement and a lower left displacement that result when a rearward test force is exerted on a lower right bearing and a lower left bearing that support the lower cross portion with the upper cross portion removed are equal or substantially equal.

13 Claims, 8 Drawing Sheets

(51) Int. Cl.
  *B62K 25/08*  (2006.01)
  *B62K 5/05*  (2013.01)
  *B62K 21/00*  (2006.01)
  *B62K 5/027*  (2013.01)

(56) References Cited

U.S. PATENT DOCUMENTS

| | | | |
|---|---|---|---|
| 8,991,542 B2* | 3/2015 | Yu | B62K 5/027 180/209 |
| 2004/0140645 A1 | 7/2004 | Hayashi | |
| 2005/0012291 A1 | 1/2005 | Bagnoli | |
| 2005/0167174 A1 | 8/2005 | Marcacci | |
| 2008/0164085 A1* | 7/2008 | Cecinini | B60G 21/007 180/210 |
| 2013/0168944 A1* | 7/2013 | Bartolozzi | B60G 3/01 280/269 |
| 2015/0239522 A1* | 8/2015 | Iizuka | B62K 5/027 280/267 |
| 2015/0259027 A1* | 9/2015 | Takano | B62K 5/05 280/267 |
| 2015/0291241 A1* | 10/2015 | Takano | B62K 5/05 280/5.509 |
| 2015/0298736 A1* | 10/2015 | Sasaki | B62J 15/00 280/124.103 |
| 2015/0321721 A1* | 11/2015 | Sasaki | B62K 5/05 180/210 |
| 2015/0344097 A1* | 12/2015 | Iizuka | B62K 19/38 280/62 |

FOREIGN PATENT DOCUMENTS

| | | |
|---|---|---|
| JP | 2002-337779 A | 11/2002 |
| JP | 2004-359232 A | 12/2004 |
| JP | 2005-313876 A | 11/2005 |
| JP | 2011-195099 A | 10/2011 |
| WO | 2012/007819 A1 | 1/2012 |

OTHER PUBLICATIONS

Piaggio, "Catalogo Parti Di Ricambio", NTRC000U01, MP3 300 ie LT Mod. ZAPM64102, 116 pages.
Takano; "Vehicle"; U.S. Appl. No. 14/651,779, filed Jun. 12, 2015.
Takano; "Vehicle"; U.S. Appl. No. 14/652,832, filed Jun. 17, 2015.

* cited by examiner

VEHICLE

BACKGROUND OF THE INVENTION

1. Field of the Invention

The present invention relates to a vehicle that includes a body frame that can lean and two front wheels.

2. Description of the Related Art

A known vehicle includes a body frame that leans to the left or right when the vehicle is cornering and two front wheels that are aligned in a left-and-right direction of the body frame (for example, refer to Japanese Patent Unexamined Publication JP-A-2005-313876, U.S. Design Pat. D547,2425 and Catalogo partidi ricambio, MP3 300 64102 ie LT Mod. ZAPM64102, Piaggio).

The vehicle including the body frame that can lean and two front wheels includes a link mechanism. The link mechanism includes an upper cross portion and a lower cross portion. In addition, the link mechanism also includes a right side portion which supports right end portions of the upper cross portion and the lower cross portion and a left side portion which supports left end portions of the upper cross portion and the lower cross portion. Middle portions of the upper cross portion and the lower cross portion are supported on the body frame at the front of a steering shaft. The upper cross portion and the lower cross portion are supported on the body frame so as to turn about axes that extend substantially in a front-and-rear direction of the body frame. The upper cross portion and the lower cross portion turn relative to the body frame as the body frame leans. Then, a relative position of the two front wheels in an up-and-down direction of the body frame changes. The upper cross portion and the lower cross portion are provided above the two front wheels in the up-and-down direction of the body frame when the body frame rests in an upright state.

The vehicle including the body frame that can lean and two front wheels includes a right shock absorbing device which supports the right front wheel so as to move in the up-and-down direction of the body frame and a left shock absorbing device which supports the left front wheel so as to move in the up-and-down direction of the body frame. The right shock absorbing device is supported on the right side portion so as to turn about an axis of the right side portion. The left shock absorbing device is supported on the left side portion so as to turn about an axis of the left side portion. Vehicles described in Japanese Patent Unexamined Publication JP-A-2005-313876 and U.S. Design Pat. D547,2425 include further a handlebar, a steering shaft, and a turn transfer mechanism. The handlebar is fixed to the steering shaft. The steering shaft is turnably supported on the body frame relative thereto. Turning the handlebar turns the steering shaft. The turn transfer mechanism transfers the turning motion of the steering shaft to the right shock absorbing device and the left shock absorbing device.

The vehicle including the body frame that can lean and two front wheels includes many on-board components which are provided on the periphery of the steering shaft. The on-board components include lamps such as a headlamp, a radiator, a reservoir tank, electric components such as a horn, and a main switch of the vehicle, a storage box, a storage pocket and the like.

In the vehicles described in Japanese Patent Unexamined Publication JP-A-2005-313876 and U.S. Design Pat. D547, 2425, loads that are received by the right front wheel and the left front wheel are transferred to the link mechanism by the right shock absorbing device or the left shock absorbing device. The loads are transferred to the right side portion or the left side portion from the right shock absorbing device or the left shock absorbing device. The loads are transferred to the upper cross portion and the lower cross portion from the right side portion or the left side portion. The loads are transferred further to the body frame that is positioned on the periphery of the steering shaft from the upper cross portion and the lower cross portion. The link mechanism includes bearings provided between the right side portion or the left side portion and the upper cross portion and the lower cross portion and bearings provided between the upper cross portion and the lower cross portion and the body frame. These bearings function to enable the right side portion or the left side portion to turn smoothly relative to the upper cross portion and the lower cross portion and the upper cross portion and the lower cross portion to turn smoothly relative to the body frame. The bearings also function to transfer the loads received by the link mechanism to the body frame. Additionally, the right side portion, the left side portion, the upper cross portion, and the lower cross portion are each highly rigid in order to enhance the function to rotate smoothly and the function to transfer the loads. This enlarges the right side portion, the left side portion, the upper cross portion, and the lower cross portion in external size. This results in enlargement of the link mechanism that includes those portions. The enlargement of the link mechanism results in a further expansion of the movable range of the link mechanism.

The vehicles described in Japanese Patent Unexamined Publication JP-A-2005-313876 and U.S. Design Pat. D547, 2425 include the link mechanism provided on the periphery of the steering shaft so as to move as the body frame leans. Because of this, in the vehicle including the body frame that can lean and two front wheels, the on-board components need to be provided so that the on-board components do not interfere with the movable range of the link mechanism. In the vehicle that includes the body frame that can lean and two front wheels, this requirement tends to increase the construction on the periphery of the steering shaft.

SUMMARY OF THE INVENTION

Preferred embodiments of the present invention provide a vehicle including a body frame that can lean and two front wheels that prevents enlargement of a peripheral construction of a steering shaft located above the two front wheels.

According to a preferred embodiment of the present invention, a vehicle that is driven by power from a power source includes a vehicle body frame; a left front wheel and a right front wheel disposed in left-and-right direction as seen from the front of the vehicle and that are steerable; a right shock absorbing device that supports the right front wheel at a lower portion thereof and configured to absorb an upward displacement of the right front wheel in an up-and-down direction of the vehicle body frame; a left shock absorbing device that supports the left front wheel at a lower portion thereof and configured to absorb an upward displacement of the left front wheel in the up-and-down direction of the vehicle body frame; a link mechanism that includes a right side portion that supports an upper portion of the right shock absorbing device so as to turn about a right steering axis that extends in the up-and-down direction of the vehicle body frame; a left side portion that supports an upper portion of the left shock absorbing device so as to turn about a left steering axis that is parallel or substantially parallel to the right steering axis, an upper cross portion that includes a right end portion that supports an upper portion of the right side portion so as to turn about an upper right axis that extends in a front-and-rear direction of the vehicle body frame via an upper right bearing, a left end portion that supports an upper portion of the left side portion so as to turn about an upper left axis that is parallel or substantially parallel to the upper right axis via an upper left bearing, and a middle portion that is supported on the vehicle body frame so as to turn about an upper middle axis that is parallel or substantially parallel to the upper right axis and the upper left axis via an upper middle bearing; and a lower cross portion that includes a right end portion that supports a lower portion of the right side portion so as to turn about a lower right axis that is parallel or substantially parallel to the upper right axis via a lower right bearing, a left end portion that supports a lower portion of the left side portion so as to turn abut a lower left axis that is parallel or substantially parallel to the upper left axis via a lower left bearing, and a middle portion that is supported on the vehicle body frame so as to turn about a lower middle axis that is parallel or substantially parallel to the upper middle axis via a lower middle bearing; a steering shaft supported on the vehicle body frame between the right side portion and the left end portion in a left-and-right direction of the vehicle body frame, and including an upper end portion located higher in the up-and-down direction of the vehicle body frame than the lower middle axis and that is turnable about a middle steering axis that extends in the up-and-down direction of the vehicle body frame; a handlebar provided at the upper end portion of the steering shaft; and a turn transfer mechanism configured to transfer a turning motion of the steering shaft according to an operation of the handlebar to the right shock absorbing device and the left shock absorbing device; wherein with the lower cross portion removed and the upper cross portion mounted, an upper right displacement of the upper cross portion that results when a forward or rearward test force in relation to the upper right axis is exerted on the upper right bearing and an upper left displacement of the upper cross portion that results when a force that is the equal or substantially equal in magnitude and direction as the test force is exerted on the upper left bearing are equal or substantially equal to each other, with the upper cross portion removed and the lower cross portion mounted, a lower right displacement of the lower cross portion that results when a force that is equal or substantially equal in magnitude and direction as the test force is exerted on the lower right bearing and a lower left displacement of the lower cross portion that results when a force that is equal or substantially equal in magnitude and direction as the test force is exerted on the lower left bearing are equal or substantially equal to each other, the upper right displacement of the upper cross portion and the lower right displacement of the lower cross portion are different from each other, the upper left displacement of the upper cross portion and the lower left displacement of the lower cross portion are different from each other, and a shape of the upper cross portion and a shape of the lower cross portion are different from each other.

The right side portion, the left side portion, the upper cross portion, and the lower cross portion of the link mechanism are each highly rigid to enhance the function to turn smoothly and the function to transfer loads. This enlarges the external size of the right side portion, the left side portion, the upper cross portion, and the lower cross portion. This results in enlargement of the link mechanism that includes those portions. The enlargement of the link mechanism results in a further expansion of the movable range of the link mechanism. The vehicle that includes the vehicle body frame that can lean and two front wheels includes a large link mechanism that moves as the vehicle body frame leans about the periphery of the steering shaft.

Because of this, in the vehicle including the vehicle body frame that can lean and two front wheels, the on-board components need to be provided so that the on-board components do not interfere with the movable range of the link mechanism. In the vehicle that includes the vehicle body frame that can lean and two front wheels, this requirement tends to increase the construction around the periphery of the steering shaft.

A detailed analysis has been carried out on the function of the link mechanism. The link mechanism includes the function to enable the right side portion or the left side portion to turn smoothly relative to the upper cross portion and the lower cross portion and the function to enable the upper cross portion and the lower cross portion to turn smoothly relative to the vehicle body frame. Additionally, the link mechanism includes the function to transfer loads received by the right side portion or the left side portion to the vehicle body frame.

This analysis has revealed that the load received by the link mechanism includes loads acting in the direction of the rotational axes of the upper cross portion, the lower cross portion, the left side portion, and the right side portion and loads acting in directions that extend in the up-and-down direction of the vehicle body frame and that are vertical to the rotational axes. Further, the analysis has revealed that, although the ratio of assigned loads received by the link mechanism having the upper cross portion and the lower cross portion to the vehicle body frame is changed, when both the cross portions are provided to operate the link mechanism smoothly, smooth operation of the link mechanism is easily maintained.

The analysis has also revealed that the shape of the upper cross portion and the shape of the lower cross portion are allowed to differ from each other considering the fact that the smooth operation of the link mechanism is easily maintained although the ratio of assigned loads received by the link mechanism including the upper cross portion and the lower cross portion has changed.

According to a preferred embodiment of the present invention, the movable range of the link mechanism is changed from a simple shape like a rectangular parallelepiped to an irregular shape by changing the ratio of assigned loads received by the link mechanism including the upper cross portion and the lower cross portion to the vehicle body frame and making the shape of the upper cross portion and the shape of the lower cross portion differ from each other. This enhances the degree of freedom in designing the periphery of the steering shaft. As a result of this, even though various on-board components that differ in size and the link mechanism are disposed on the periphery of the steering shaft, it is possible to prevent enlargement of the periphery of the steering shaft in size. Moreover, the upper cross portion and the lower cross portion are each configured to include portions supported on the side portions at the right end portion and the left end portion thereof and supported on the vehicle body frame at the middle portion thereof, and the shape of the upper cross portion is different from the shape of the lower cross portion. With this configuration, even though the ratio of assigned loads that are allocated between the upper cross portion and the lower cross portion is changed, the smooth operation of the link mechanism is easily maintained.

Consequently, in the vehicle that includes the vehicle body frame that can lean and two front wheels, it is possible to prevent enlargement in size of the construction on the periphery of the steering shaft located above the two front wheels while maintaining the function of the link mechanism.

According to a preferred embodiment of the present invention, the upper right displacement of the upper cross portion is preferably larger than the lower right displacement of the lower cross portion, the upper left displacement of the upper cross portion is preferably larger than the lower left displacement of the lower cross portion, and the shape of the upper cross portion is preferably smaller than the shape of the lower cross portion.

According to a preferred embodiment of the present invention, the movable range of the link mechanism is changed from a simple shape like a rectangular parallelepiped to a shape in which an upper portion is small by making the shape of the upper cross portion smaller than the shape of the lower cross portion. This enhances the degree of freedom in designing an upper peripheral portion of the steering shaft. The ratio of the assigned loads allocated to the upper cross portion having a small shape is reduced, while the ratio of the assigned loads allocated to the lower cross portion having a large shape is increased, and therefore, the balance between rigidity and shape is easily controlled. This enhances the degree of freedom in designing the upper peripheral portion of the steering shaft. As a result of this, even though various on-board components that differ in size and the link mechanism are disposed on the periphery of the steering shaft, it is possible to prevent enlargement in size of the periphery of the steering shaft. Moreover, the smooth operation of the link mechanism is easily maintained only by changing the ratio of assigned loads allocated between the upper cross portion and the lower cross portion, while both the upper cross portion and the lower cross portion are provided to operate the link mechanism smoothly.

Consequently, in the vehicle that includes the vehicle body frame that can lean and two front wheels, it is possible to prevent even more the enlargement in size of the peripheral construction of the steering shaft located above the two front wheels while maintaining the function of the link mechanism.

According to a preferred embodiment of the present invention, the lower right displacement of the lower cross portion is preferably larger than the upper right displacement of the upper cross portion, the lower left displacement of the lower cross portion is preferably larger than the upper left displacement of the upper cross portion, and the shape of the lower cross portion is preferably smaller than the shape of the upper cross portion.

According to a preferred embodiment of the present invention, the movable range of the link mechanism is changed from a simple shape like a rectangular parallelepiped to a shape in which a lower portion is small by making the shape of the lower cross portion smaller than the shape of the upper cross portion. This enhances the degree of freedom in designing a lower peripheral portion of the steering shaft. The ratio of the assigned loads allocated to the lower cross portion having a small shape is reduced, while the ratio of the assigned loads allocated to the upper cross portion having a large shape is increased, and therefore, the balance between rigidity and shape is easily controlled. This enhances the degree of freedom in designing a lower peripheral portion of the steering shaft. As a result of this, even though various on-board components that differ in size and the link mechanism are disposed on the periphery of the steering shaft, it is possible to prevent enlargement of the size of the periphery of the steering shaft. Moreover, the smooth operation of the link mechanism is easily maintained only by changing the ratio of assigned loads allocated between the upper cross portion and the lower cross portion, while both the upper cross portion and the lower cross portion are provided to operate the link mechanism smoothly.

Consequently, in the vehicle that includes the vehicle body frame that can lean and two front wheels, it is possible to prevent even more the enlargement in size of the peripheral construction of the steering shaft located above the two front wheels while maintaining the function of the link mechanism.

According to a preferred embodiment of the present invention, a material of the upper cross portion is preferably identical to a material of the lower cross portion.

According to a preferred embodiment of the present invention, the material of the upper cross portion is preferably identical to the material of the lower cross portion, and therefore, the balance between rigidity and shape is easily controlled. This enhances the degree of freedom in designing the periphery of the steering shaft. As a result of this, even though various on-board components that differ in size and the link mechanism are disposed on the periphery of the steering shaft, it is possible to prevent enlargement in size of the periphery of the steering shaft. Moreover, although the ratio of assigned loads allocated between the upper cross portion is changed by making the shape of the upper cross portion differ from the shape of the lower cross portion, it is easy to maintain the smooth operation of the link mechanism.

Consequently, in the vehicle that includes the vehicle body frame that can lean and two front wheels, it is possible to further prevent enlargement in size of the peripheral construction of the steering shaft located above the two front wheels while maintaining the function of the link mechanism.

According to a preferred embodiment of the present invention, a material of the upper cross portion may be different from a material of the lower cross portion.

According to a preferred embodiment of the present invention, the material of the upper cross portion is preferably different from the material of the lower cross portion, and therefore, a controlling range of the balance between rigidity and shape is increased. For example, when the upper cross portion that has a smaller rigidity than that of the lower cross portion is made of a material having high rigidity, the shape of the upper cross portion is made smaller. This enhances the degree of freedom in designing the periphery of the steering shaft. As a result of this, even though various on-board components that differ in size and the link mechanism are disposed on the periphery of the steering shaft, it is possible to prevent enlargement in size of the periphery of the steering shaft. Moreover, although the ratio of assigned loads allocated between the upper cross portion and the lower cross portion is changed by making the shape of the upper cross portion differ from the shape of the lower cross portion, it is easy to maintain the smooth operation of the link mechanism.

Consequently, in the vehicle that includes the vehicle body frame that can lean and two front wheels, it is possible to further prevent enlargement in size of the peripheral construction of the steering shaft located above the two front wheels while maintaining the function of the link mechanism.

According to a preferred embodiment of the present invention, the vehicle body frame preferably includes a link supporting portion that turnably supports the upper cross portion and the lower cross portion, and a shape of a front portion of the upper cross portion located farther forward in the direction of the upper right axis than the link supporting portion is preferably different from a shape of a rear portion of the upper cross portion located rearward of the link supporting portion.

According to a preferred embodiment of the present invention, the shape of the front portion of the upper cross portion located farther forward than the link supporting portion is different from the shape of the rear portion of the upper cross portion that is located farther rearward than the link supporting portion, and therefore, the movable range of the link mechanism is changed from a simple shape like a rectangular parallelepiped to the irregular shape. This enhances the degree of freedom in designing a space on the periphery of the rear portion of the upper cross portion. As a result of this, even though various on-board components that differ in size and the link mechanism are disposed on the periphery of the steering shaft, it is possible to prevent enlargement in size of the periphery of the steering shaft.

According to a preferred embodiment of the present invention, the vehicle body frame preferably includes a link supporting portion that turnably supports the upper cross portion and the lower cross portion, and a shape of a front portion of the lower cross portion located farther forward in the direction of the lower right axis than the link supporting portion is preferably different from a shape of a rear portion of the lower cross portion located farther rearward than the link supporting portion.

According to a preferred embodiment of the present invention, the shape of the front portion of the lower cross portion located farther forward than the link supporting portion is different from the shape of the rear portion of the lower cross portion located farther rearward than the link supporting portion, and therefore, the movable range of the link mechanism is changed from a simple shape like a rectangular parallelepiped to the irregular shape. This enhances the degree of freedom in designing a space on the periphery of the rear portion of the upper cross portion. As a result of this, even though various on-board components that differ in size and the link mechanism are disposed on the periphery of the steering shaft, it is possible to prevent enlargement in size of the periphery of the steering shaft.

According to a preferred embodiment of the present invention, the vehicle body frame preferably includes a link supporting portion that turnably supports the upper cross portion and the lower cross portion, and the upper cross portion preferably includes an upper front portion located farther forward in the direction of the upper right axis than the link supporting portion and that is supported at the right end portion and the left end portion and that is supported at the middle portion and an upper rear portion located farther rearward in the direction of the lower right axis than the link supporting portion and that is supported at the right end portion and the left end portion and that is supported at the middle portion.

According to a preferred embodiment of the present invention, the upper cross portion includes the upper front portion located farther forward than the link supporting portion and the upper rear portion located farther rearward than the link supporting portion, and therefore, the balance between rigidity and shape of the upper cross portion is easily controlled. This enhances the degree of freedom in designing a lower peripheral portion of the steering shaft. This enhances the degree of freedom in designing a space on the periphery of the rear portion of the upper cross portion. As a result of this, even though various on-board components that differ in size and the link mechanism are disposed on the periphery of the steering shaft, it is possible to prevent enlargement in size of the periphery of the steering shaft.

According to a preferred embodiment of the present invention, the vehicle body frame preferably includes a link supporting portion that turnably supports the upper cross portion and the lower cross portion, and the lower cross portion preferably includes a lower front portion located farther forward in the direction of the lower right axis than the link supporting portion and that is supported at the right end portion and the left end portion and that is supported at the middle portion and a lower rear portion located farther rearward in the direction of the lower right axis than the link supporting portion and that is supported at the right end portion and the left end portion and that is supported at the middle portion.

According to a preferred embodiment of the present invention, the lower cross portion includes the lower front portion located farther forward than the link supporting portion and the lower rear portion located farther rearward than the link supporting portion, and therefore, the balance between rigidity and shape of the lower cross portion is easily controlled. This enhances the degree of freedom in designing a lower peripheral portion of the steering shaft. This enhances the degree of freedom in designing a space on the periphery of the rear portion of the lower cross portion. As a result of this, even though various on-board components that differ in size and the link mechanism are disposed on the periphery of the steering shaft, it is possible to prevent enlargement in size of the periphery of the steering shaft.

According to a preferred embodiment of the present invention, the vehicle body frame preferably includes a link supporting portion that turnably supports the upper cross portion and the lower cross portion, and the upper cross portion or the lower cross portion is preferably provided only either forward of or rearward of the link supporting portion and not provided both forward of and rearward of the link supporting portion.

According to a preferred embodiment of the present invention, the upper cross portion or the lower cross portion is provided only either forward of or rearward of the link supporting portion, and therefore, the movable range of the link mechanism is changed from a simple shape like a rectangular parallelepiped to an irregular shape in which an upper portion is smaller than a lower portion. This enhances the degree of freedom in designing the periphery of the steering shaft. As a result of this, even though various on-board components that differ in size and the link mechanism are disposed on the periphery of the steering shaft, it is possible to prevent enlargement of the periphery of the steering shaft in size.

According to a preferred embodiment of the present invention, a front end of the upper cross portion and a front end of the lower cross portion are preferably provided in different positions in relation to the direction of the upper right axis.

According to a preferred embodiment of the present invention, the front end of the upper cross portion and the front end of the lower cross portion are provided in the different positions in relation to the direction of the upper right axis, and therefore, the movable range of the link mechanism is changed from a simple shape like a rectangular parallelepiped to a shape that is irregular in relation to a front-and-rear direction of the vehicle body frame. This enhances the degree of freedom in designing the periphery of the steering shaft. As a result of this, even though various on-board components that differ in size and the link mechanism are disposed on the periphery of the steering shaft, it is possible to prevent enlargement of the periphery of the steering shaft in size.

According to a preferred embodiment of the present invention, a rear end of the upper cross portion and a rear end of the lower cross portion are preferably provided in different positions in relation to the direction of the upper right axis.

According to a preferred embodiment of the present invention, the rear end of the upper cross portion and the rear end of the lower cross portion are preferably provided in different positions in relation to the direction of the upper right axis, and therefore, the movable range of the link mechanism is changed from a simple shape like a rectangular parallelepiped to a shape that is irregular in relation to the front-and-rear direction of the vehicle body frame. This enhances the degree of freedom in designing the periphery of the steering shaft. As a result of this, even though various on-board components that differ in size and the link mechanism are disposed on the periphery of the steering shaft, it is possible to prevent enlargement of the periphery of the steering shaft in size.

According to a preferred embodiment of the present invention, the vehicle body frame preferably includes a link supporting portion that turnably supports the upper cross portion and the lower cross portion, and the link supporting portion preferably supports the steering shaft turnably.

According to a preferred embodiment of the present invention, the link supporting portion supports the link mechanism that supports the right front wheel, the left front wheel, the right shock absorbing device, and the left shock absorbing device and is highly rigid. Because of this, the configuration that supports the steering shaft is simplified by supporting the steering shaft due to the high rigidity of the link supporting portion. As a result, it is possible to prevent enlargement of the peripheral construction of the steering shaft.

According to a preferred embodiment of the present invention, it is possible to prevent enlargement of the peripheral construction of the steering shaft located above the two front wheels while the function of the link mechanism is maintained.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
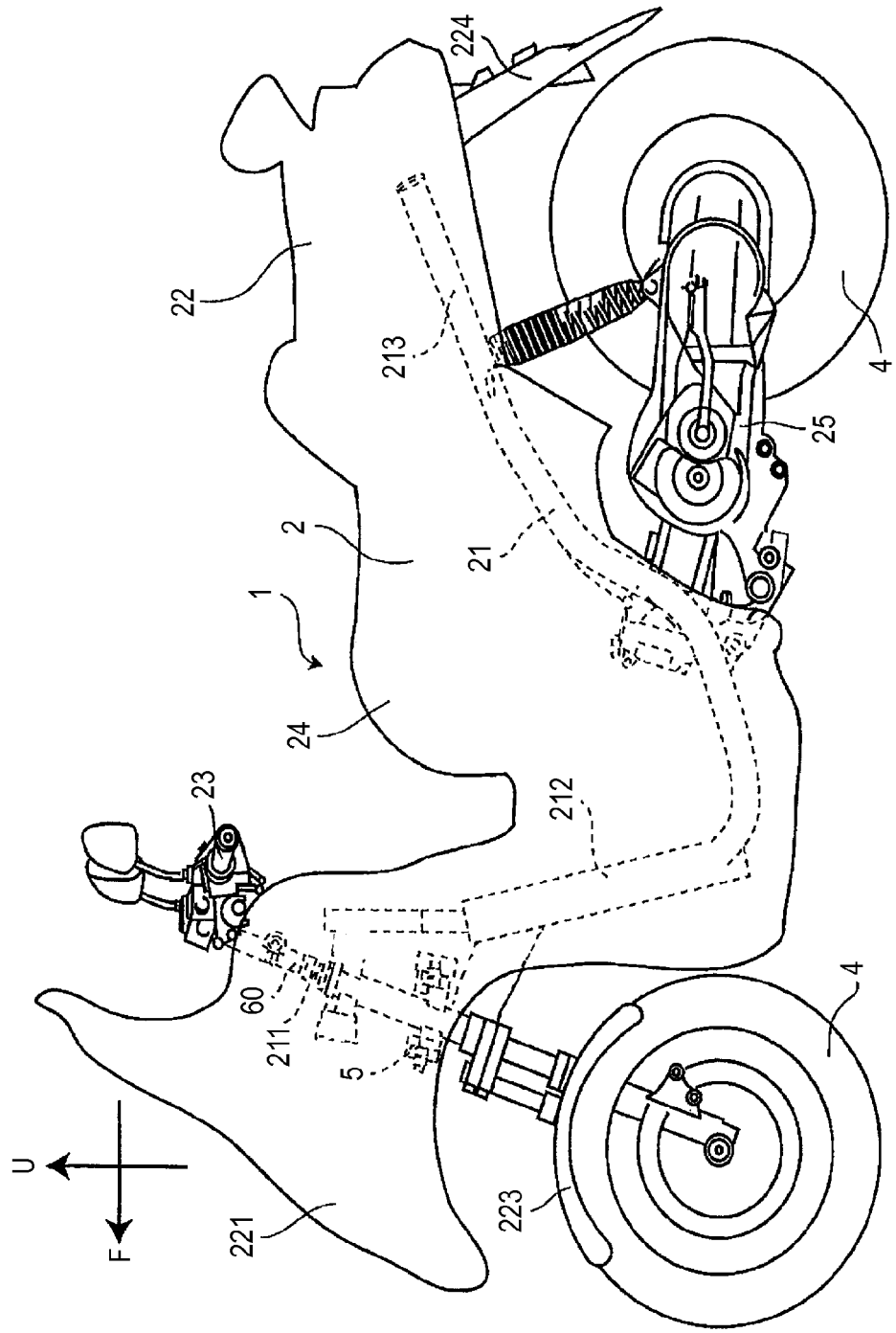
FIG. 1 is a left side view of a vehicle according to a preferred embodiment of the present invention.

Hereinafter, a vehicle 1 which is one type of a vehicle according to a preferred embodiment of the present invention will be described with reference to the drawings. In the drawings, like reference numerals are given to like or corresponding portions and the description thereof will not be made repeatedly.

In the following description, an arrow F in the drawings denotes a forward direction of the vehicle 1. An arrow R in the drawings denotes a rightward direction of a vehicle body frame of the vehicle 1. An arrow L in the drawings denotes a leftward direction of the vehicle body frame of the vehicle 1. An arrow U denotes a perpendicularly upward direction. A transversely middle position indicates a central position in the direction of a width of the vehicle as seen from the front. A transversely lateral direction of the vehicle indicates a leftward or rightward direction as seen from the transversely middle position.

FIG. 1 is a schematic overall side view of the vehicle 1. In the following description, when front, rear, left, and right are referred to in indicating directions, they denote front, rear, left, and right as seen from a rider who rides on the vehicle 1.

The vehicle 1 includes a vehicle main body 2, front wheels 3, and a rear wheel 4. The vehicle main body 2 includes a vehicle body frame 21, a body cover 22, a handlebar 23, a seat 24, and a power unit 25.

The vehicle body frame 21 supports the power unit 25, the seat 24 and the like. The power unit 25 includes a power source such as an engine or an electric motor, a transmission and the like. In FIG. 1, the vehicle body frame 21 is shown by broken lines.

The vehicle body frame 21 includes a headstock 211, a front frame 212, and a rear frame 213. The headstock 211 is disposed at a front portion of the vehicle. A link mechanism 5 is disposed on the periphery of the headstock 211.

A steering shaft 60 is inserted into the headstock 211 so as to turn therein. The steering shaft 60 extends in an up-and-down direction. The handlebar 23 is mounted on an upper end of the steering shaft 60. The front frame 212 is inclined downward from a front end thereof to the rear. The front frame 212 is connected to the headstock 211 in a position located farther rearward than an upper cross portion 51, which will be described below. The rear frame 213 supports the seat 24 and a tail lamp.

The vehicle body frame 21 is covered by the body cover 22. The body cover 22 includes a front cover 221, front fenders 223, and a rear fender 224.

The front cover 221 is positioned forward of the seat 24. The front cover 221 covers the headstock 211 and the link mechanism 5.

The front fenders 223 are provided individually above a pair of left and right front wheels 3. The front fenders 223 are disposed below the front cover 221. The rear fender 224 is disposed above the rear wheel 4.

The front wheels 3 are disposed below the headstock 211 and the link mechanism 5. The front wheels 3 are disposed below the front cover 221.

Figure 2:
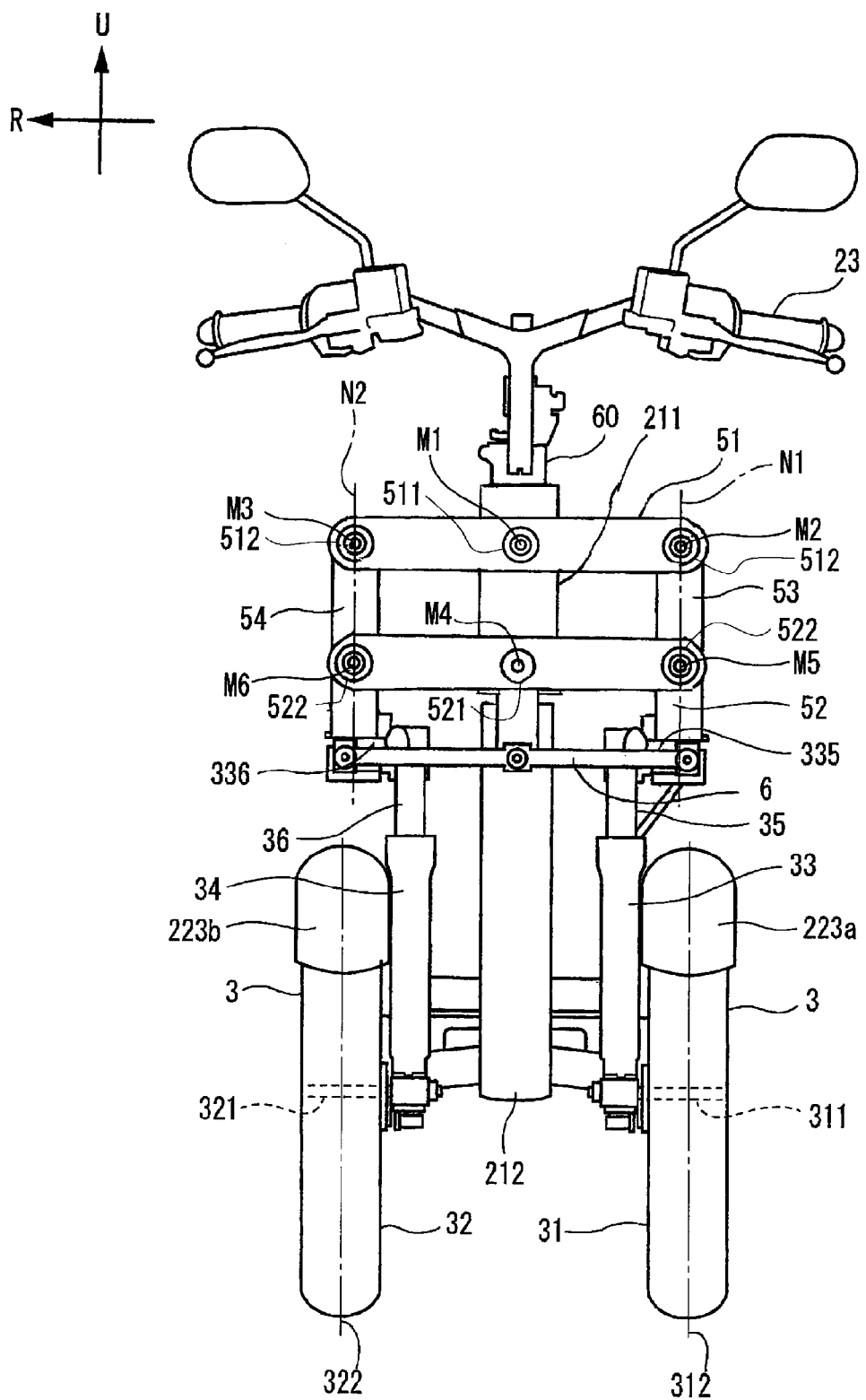
FIG. 2 is an overall front view of the vehicle with a body cover removed.

FIG. 2 is an overall front view of the vehicle 1 with the body cover 22 removed. In FIG. 2, the front frame 212 and the like are omitted from the illustration.

The vehicle 1 includes the handlebar 23, the steering shaft 60, the headstock 211, the pair of left and front wheels 3, and the link mechanism 5. The link mechanism 5 is disposed on the periphery of the headstock 211. The link mechanism 5 is connected to a left front wheel 31 and a right front wheel 32. Additionally, the link mechanism 5 is turnably mounted on the headstock 211. The link mechanism 5 includes the upper cross portion 51, a lower cross portion 52, a left side portion 53, a right side portion 54, a first bracket 335, a second bracket 336, a left shock absorber 33, a right shock absorber 34, and a tie-rod 6.

The front wheels 3 are aligned side by side in a left-and-right direction of the vehicle body frame 21 and include the left front wheel 31 and the right front wheel 32 that are steered. A left front fender 223a is disposed directly above the left front wheel 31. A right front fender 223b is disposed directly above the right front wheel 32. The right front wheel 32 is disposed symmetrically with the left front wheel 31 with respect to the headstock 211 in relation to the left-and-right direction of the vehicle body frame 21.

Figure 5:
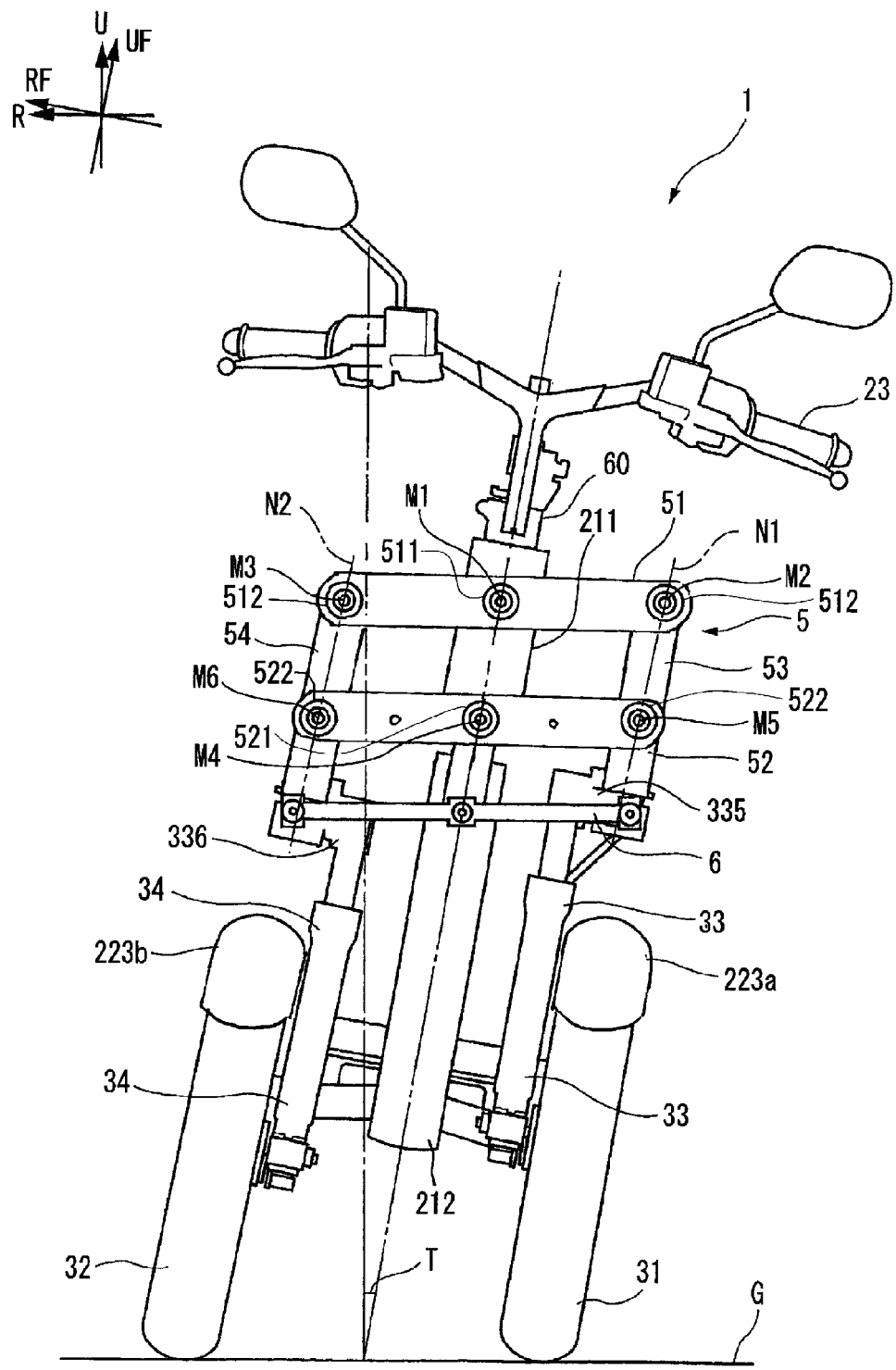
FIG. 5 is an overall front view showing a state in which the vehicle is caused to lean.

When referred to in this description, a "rightward direction RF of the vehicle body frame 21" denotes a rightward direction that intersects an axial direction of the headstock 211 perpendicularly or substantially perpendicularly when the vehicle 1 is seen from the front. Additionally, an upward direction UF of the vehicle body frame 21 denotes an upward direction of the vehicle body frame 21 when the vehicle 1 rests upright. For example, the upward direction of the vehicle body frame 21 coincides with an axial direction of the headstock 211 when the vehicle 1 is seen from the front. When the vehicle 1 rests in an upright state as shown in FIG. 2, the rightward direction RF of the vehicle body frame 21 coincides with a rightward direction R in the horizontal direction. Because of this, only the rightward direction R in the horizontal direction is shown in FIG. 2. When the vehicle 1 leans relative to a road surface G as shown in FIG. 5, the rightward direction RF of the vehicle body frame 21 does not coincide with the rightward direction R in the horizontal direction, and the upward direction UF of the vehicle body frame 21 does not coincide with an upward direction U in a perpendicular direction.

The left front wheel 31 is connected to the left shock absorber 33. The left front wheel 31 is connected to a lower portion of the left shock absorber 33. The left front wheel 31 rotates about a rotational shaft 311. The rotational shaft 311 extends in the left-and-right direction of the vehicle body frame 21. The left front wheel 31 turns about a turning axis 312. The vehicle 1 changes its traveling direction as a result of the left front wheel 31 turning about the turning axis 312.

The right front wheel 32 is connected to the right shock absorber 34. The right front wheel 32 is connected to a lower portion of the right shock absorber 34. The right front wheel 32 rotates about a rotational shaft 321. The rotational shaft 321 extends in the left-and-right direction of the vehicle body frame 21. The right front wheel 32 turns about a turning axis 322. The vehicle 1 changes its traveling direction as a result of the right front wheel 32 turning about the turning axis 322.

The left shock absorber 33 absorbs impacts exerted on the left front wheel 31. The left shock absorber 33 is disposed below the link mechanism 5 in relation to the up-and-down direction of the vehicle body frame 21. The left shock absorber 33 is provided between the left side portion 53 (refer to FIG. 3), which will be described below, and the left front wheel 31. The left shock absorber 33 extends along a left steering axis N1 that extends in a direction in which the steering shaft 60 and the headstock 211 extend. The left shock absorber 33 is disposed to the left of the headstock 211 in relation to the left-and-right direction of the vehicle body frame 21. The left shock absorber 33 is disposed to the right of the left front wheel 31 in relation to the left-and-right direction of the vehicle body frame 21.

The right shock absorber 34 absorbs impacts exerted on the right front wheel 32. The right shock absorber 34 is disposed below the link mechanism 5 in relation to the up-and-down direction of the vehicle body frame 21. The right shock absorber 34 is provided between the right side portion 54 (refer to FIG. 3), which will be described below, and the right front wheel 32. The right shock absorber 34 extends along a right steering axis N2 in which the steering shaft 60 and the headstock 211 extend. The right shock absorber 34 is disposed to the right of the headstock 211 in relation to the left-and-right direction of the vehicle body frame 21. The right shock absorber 34 is disposed to the left of the right front wheel 32 in relation to the left-and-right direction of the vehicle body frame 21.

The tie-rod 6 transfers a turning motion of the handlebar 23 to the left front wheel 31 and the right front wheel 32. By doing so, the left front wheel 31 and the right front wheel 32 are steered by the handlebar 23. The tie-rod 6 is forward of the headstock 211. The tie-rod 6 extends in the left-and-right direction of the vehicle body frame 21. The tie-rod 6 is disposed below the lower cross portion 52, which will be described below, and above the left front wheel 31 and the right front wheel 32 in relation to the up-and-down direction of the vehicle body frame 21. The tie-rod 6 is connected to a lower end portion of the steering shaft 60. When the steering shaft 60 is turned, the tie-rod 6 moves laterally to the left or right.

Figure 3:
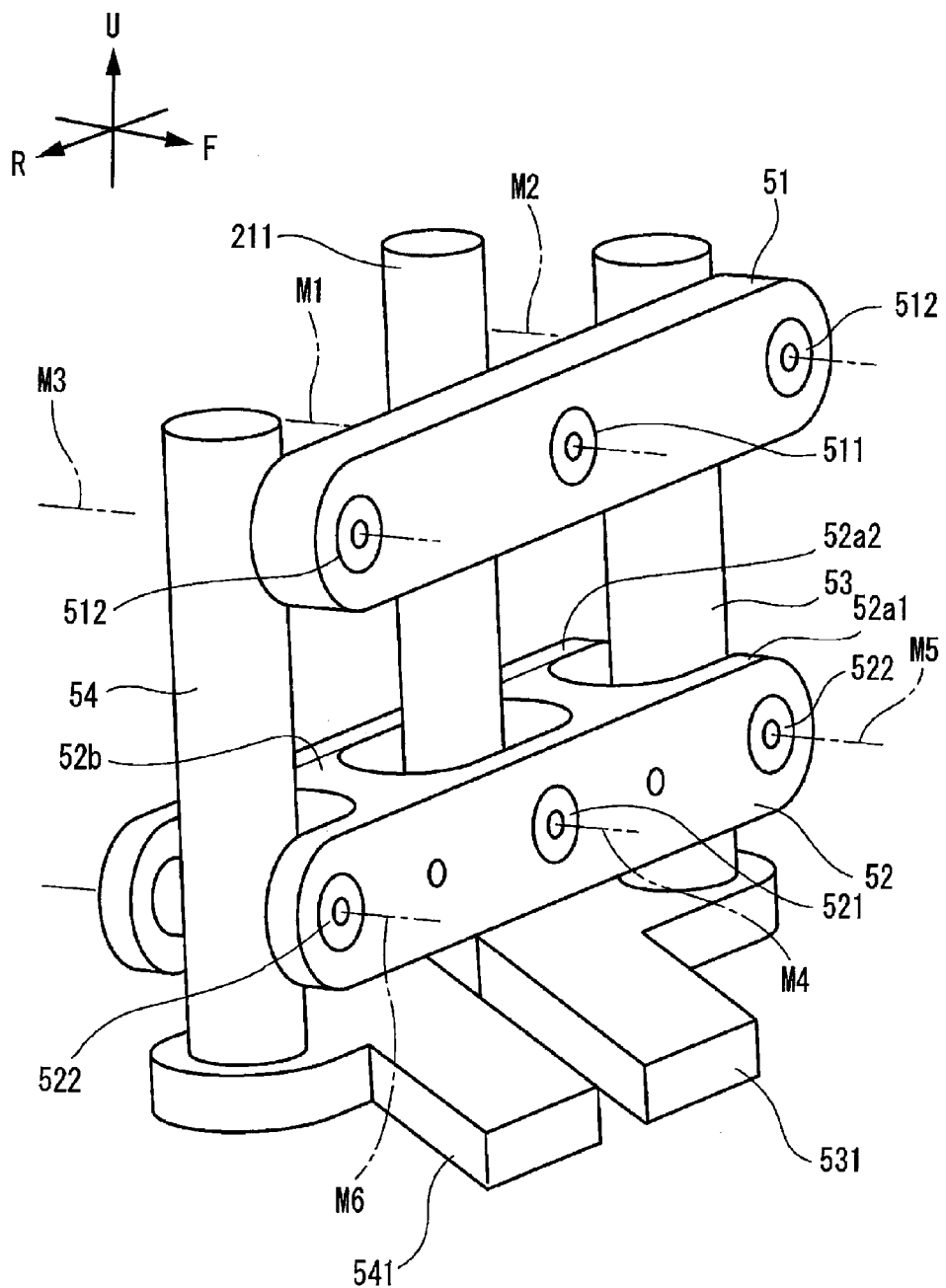
FIG. 3 is a perspective view of a link mechanism.

FIG. 3 is a perspective view of the link mechanism 5 with the left shock absorber 33 and the right shock absorber 34 omitted from the illustration.

The left side portion 53 is disposed to the left of the headstock 211 in relation to the left-and-right direction of the vehicle body frame 21. The right side portion 54 is disposed to the right of the headstock 211 in relation to the left-and-right direction of the vehicle body frame 21. The left side portion 53 and the right side portion 54 are preferably cylindrical or substantially cylindrical members.

The left side portion 53 and the right side portion 54 extend in the up-and-down direction of the vehicle body frame 21 with the vehicle resting in the upright state. A mounting piece 531 where the left shock absorber 33 is mounted is provided at a lower end of the left side portion 53. A lower portion of the left side portion 53 supports the left shock absorber 33 so as to turn about the left steering axis N1. A mounting piece 541 where the right shock absorber 34 is mounted is provided at a lower end of the right side portion 54. A lower portion of the right side portion 54 supports the right shock absorber 34 so as to turn about the right steering axis N2.

In the present preferred embodiment, the upper cross portion 51 preferably includes a single plate-shaped portion that extends in the left-and-right direction when seen from the front of the vehicle. The upper cross portion 51 is provided farther forward toward the front of the vehicle than the headstock 211. The upper cross portion 51 includes an upper middle bearing 511 provided at a middle portion of the upper cross portion 51 in relation to the left-and-right direction of the vehicle body frame 21 and an upper left bearing 512 and an upper right bearing 512 provided at or near leftmost and rightmost portions of the upper cross portion 51 in relation to the left-and-right direction of the vehicle body frame 21. An upper middle axis M1 that is a rotational center of the upper middle bearing 511, an upper left axis M2 that is a rotational center of the upper left bearing 512, and an upper right axis M3 that is a rotational center of the upper right axis 512 are provided parallel or substantially parallel to one another.

The upper cross portion 51 is mounted on the headstock 211 via the upper middle bearing 511. This allows the upper cross portion 51 to be supported on the headstock 211 so as to turn about the upper middle axis M1 relative to the headstock 211.

The upper cross portion 51 is connected to an upper portion of the left side portion 53 and an upper portion of the right side portion 54 via the upper left bearing 512 and the upper right bearing 512, respectively. This allows the upper cross portion 51 to turn about the upper left axis M2 and the upper right axis M3 relative to the left side portion 53 and the right side portion 54, respectively.

In the present preferred embodiment, the upper cross portion 51 preferably includes a single portion that supports the upper portion of the right side portion 54 at a right end portion thereof so as to turn about the upper right axis M3 that extends in a front-and-rear direction of the vehicle body frame 21 via the upper right bearing 512, supports the upper portion of the left side portion 53 at a left end portion thereof so as to turn about the upper left axis M2 that is parallel or substantially parallel to the upper right axis M3 via the upper left bearing 512, and that is supported on the vehicle body frame 21 at the middle portion thereof so as to turn about the upper middle axis M1 that is parallel or substantially parallel to the upper right axis M3 and the upper left axis M2 via the upper middle bearing 511.

The lower cross portion 52 extends in the left-and-right direction of the vehicle body frame 21 when seen from the front of the vehicle. A length in the left-and-right direction of the lower cross portion 52 is equal or substantially equal to a length in the left-and-right direction of the upper cross portion 51. The lower cross portion 52 is provided below the upper cross portion 51. The lower cross portion 52 has a rigidity that is larger than that of the upper cross portion 51. The rigidities of these cross portions will be described in detail below.

The lower cross portion 52 includes a front lower cross portion 52a1 and a rear lower cross portion 52a2 that hold the headstock 211 therebetween in the front-and-rear direction of the vehicle body frame 21 and a connecting portion 52b where the front lower cross portion 52a1 and the rear lower cross portion 52a2 are connected together with bolts, for example. The connecting portion 52b is preferably integral with the front lower cross portion 52a1. The connecting portion 52b is provided in a position where the connecting portion 52b does not interfere with the headstock 211, the left side portion 53, and the right side portion 54 even when the link mechanism 5 is actuated to operate as will be described below. In the present preferred embodiment, the front lower cross portion 52a1 and the rear lower cross portion 52a2 have a thickness in the front-and-rear direction of the vehicle body frame 21 that is equal or substantially equal to a thickness in the front-and-rear direction of the vehicle body frame 21 of the upper cross portion 51. Additionally, the upper cross portion 51, the front lower cross portion 52a1, and the rear lower cross portion 52a2 are preferably made of the same steel.

A lower middle bearing 521 provided at a middle portion in the left-and-right direction of the vehicle body frame 21 and a lower left bearing 522 and a lower right bearing 522 provided at or near leftmost and rightmost portions in the left-and-right direction of the vehicle body frame 21 are provided in each of the pair of front lower cross portion 52a1 and rear lower cross portion 52a2 of the lower cross portion 52. These lower middle bearings 521, the lower left bearings 522, and the lower right bearings 522 are arranged so that a lower middle axis M4, a lower left axis M5, and a lower right axis M6 that are respective rotational centers of the bearings are parallel or substantially parallel to one another. Additionally, the lower middle axis M4, the lower left axis M5, and the lower right axis M6 are also arranged so as to be parallel or substantially parallel to the upper middle axis M1, the upper left axis M2, and the upper right axis M3. In addition, in relation to their positions in the left-and-right direction of the vehicle body frame 21, the lower left bearing 522 and the lower right bearing 522 preferably have the same positions as the upper left bearing 512 and the upper right bearing 512, respectively, in relation to the left-and-right direction of the vehicle body frame 21 with the vehicle 1 resting in the upright state.

The lower cross portion 52 is mounted on the headstock 211 via the lower middle bearings 521 in a position located below the upper cross portion 51 in relation to the up-and-down direction of the vehicle body frame 21. This allows the lower cross portion 52 to be supported on the headstock 211 so as to turn about the lower middle axis M4.

The lower cross portion 52 is connected to a lower portion of the left side portion 53 and a lower portion of the right side portion 54 via the lower left bearings 522 and the lower right bearings 522, respectively. This allows the lower cross portion 52 to turn about the lower left axis M5 and the lower right axis M6 relative to the left side portion 53 and the right side portion 54, respectively.

In the present preferred embodiment, the lower cross portion 52 preferably includes two portions. In particular, the lower cross portion 52 includes the portion 52a2 that supports the lower portion of the right side portion 54 at the right end portion thereof via the lower right bearing 522 so as to turn about the lower right axis M6 that is parallel or substantially parallel to the upper right axis M3, supports the lower portion of the left side portion 53 at the left end portion thereof via the lower left bearing 522 so as to turn about the lower left axis M5 that is parallel or substantially parallel to the upper left axis M2, and that is supported on the vehicle body frame 21 at the middle portion thereof via the lower middle bearing 521 so as to turn about the lower middle axis that is parallel or substantially parallel to the upper middle axis and located rearward of the headstock 211, and the portions 52a1 and 52b located forward of the portion 52a2 to be connected to the portion 52a2, that supports the lower portion of the right side portion 54 at the right end portion thereof via the lower right bearing 522 so as to turn about the lower right axis M6 that is parallel or substantially parallel to the upper right axis M3, supports the lower portion of the left side portion 53 at the left end portion thereof via the lower left bearing 522 so as to turn about the lower left axis M5 that is parallel or substantially parallel to the upper left axis M2, and that is supported on the vehicle body frame 21 at the middle portion thereof via the lower middle bearing 521 so as to turn about the lower middle axis that is parallel or substantially parallel to the upper middle axis.

In this manner, the upper cross portion 51 is supported on the headstock 211 so as to turn about the upper middle axis M1 located above the left front wheel 31 and the right front wheel 32 in relation to the up-and-down direction of the vehicle body frame 21. The lower cross portion 52 is supported on the headstock 211 so as to turn about the lower middle axis M4 located above the left front wheel 31 and the right front wheel 32 and located below the upper middle axis M1 in relation to the up-and-down direction of the vehicle body frame 21. In the present preferred embodiment, the entire upper cross portion 51 and lower cross portion 52 are disposed above the left front wheel 31 and the right front wheel 32 in relation to the up-and-down direction of the vehicle body frame 21.

Thus, by being configured in the manner described above, the link mechanism 50 operates within a plane that contains the left side portion 53 and the right side portion 54. It is noted that the link mechanism 50 is mounted on the headstock 211. Because of this, even though the steering shaft 60 turns in association with the turn of the handlebar 23, the link mechanism 50 is not turned relative to the vehicle body frame 21.

Figure 4:
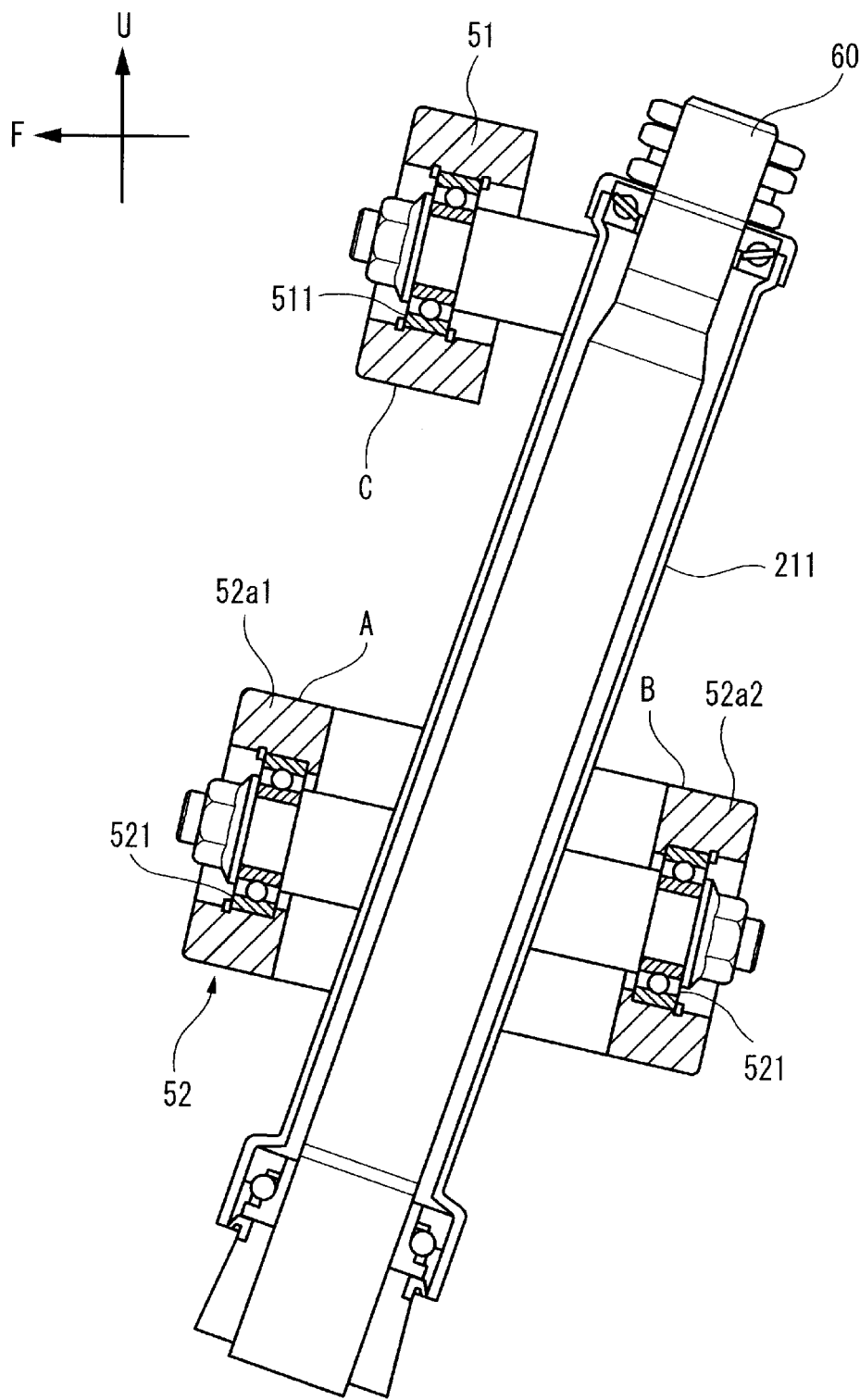
FIG. 4 is a side sectional view of the link mechanism.

FIG. 4 is a sectional view showing an upper portion of the link mechanism 50 as seen from a side of the vehicle with the vehicle resting in the upright state. As shown therein, in the present preferred embodiment, a lower surface C of the upper cross portion 51 is situated between an upper surface A of the front lower cross portion 52a1 that defines a front portion of the lower cross portion 52 and an upper surface B of the rear lower cross portion 52a2 that defines a rear portion of the lower cross portion 52 in relation to the front-and-rear direction of the vehicle body frame 21.

Although the link mechanism 5 with the vehicle resting in the upright state is shown in FIG. 4, the positional relationship described above will be maintained even when the link mechanism 5 is actuated to operate as the vehicle body leans as will be described below. In particular, even though the link mechanism 5 is actuated to operate, the lower surface C of the upper cross portion 51 is still situated between the upper surface A of the front lower cross portion 52a1 that defines the front portion of the lower cross portion 52 and the upper surface B of the rear lower cross portion 52a2 that defines the rear portion of the lower cross portion 52 in relation to the front-and-rear direction of the frame body 21.

In other words, the link mechanism 5 is provided so that a front end of the upper cross portion 51 and a front end of the lower cross portion 52 are situated in different positions in the direction of the upper right axis M3.

As shown in FIG. 2, the first bracket 335 is provided at a lower portion of the left side portion 53. The first bracket 335 is connected to the left shock absorber 33. The first bracket 335 is mounted so as to turn relative to the left side portion 53. The tie-rod 6 is mounted on the first bracket 335 so as to turn relative thereto. A turning axis on which the first bracket 335 and the left side portion 53 turn relative to each other and a turning axis on which the first bracket 335 and the tie-rod 6 turn relative to each other are parallel or substantially parallel to a direction in which the left side portion 53 extends (the left steering axis N1).

The second bracket 336 is provided at a lower portion of the right side portion 54. The second bracket 336 is connected to the right shock absorber 34. The second bracket 336 is mounted so as to turn relative to the right side portion 54. The tie-rod 6 is mounted on the second bracket 336 so as to turn relative thereto. A turning axis on which the second bracket 336 and the right side portion 54 turn relative to each other and a turning axis on which the second bracket 336 and the tie-rod 6 turn relative to each other are parallel or substantially parallel to a direction in which the right side portion 54 extends (the right steering axis N2).

The steering shaft 60 is supported on the vehicle body frame 21 between the left side portion 53 and the right side portion 54 in the left-and-right direction of the vehicle body frame 21. An upper end portion of the steering shaft 60 is provided above the lower middle axis M4 in the up-and-down direction of the vehicle body frame 21. The steering shaft 60 turns about a middle steering axis Z that extends in the up-and-down direction of the vehicle body frame 21. The handlebar 23 is provided at the upper end portion of the steering shaft 60. The tie-rod 6 (an example of a turn transfer mechanism) transfers a turning motion of the steering shaft 60 that corresponds to an operation of the handlebar 23 to the right shock absorber 34 and the left shock absorber 33.

When the steering shaft 60 turns as the handlebar 23 turns, the tie-rod 6 moves in the left-and-right direction of the vehicle body frame 21. Then, the first bracket 335 turns about the turning axis on which the first bracket 335 turns relative to the left side portion 53 as the tie-rod 6 moves. This moves a connecting portion 52b where the first bracket 335 connects to the left shock absorber 33 in the left-and-right direction of the vehicle body frame 21, and the left front wheel 31 turns about the second turning axis 312.

In this manner, the first bracket 335 transfers the turning motion of the handlebar 23 to the left front wheel 31. Similarly, the second bracket 336 transfers the turning motion of the handlebar 23 to the right front wheel 32.

FIG. 5 is an overall front view of the vehicle 1 of which the vehicle body is caused to lean at an angle T to the left in relation to a perpendicular direction of the vehicle body from the state shown in FIG. 2. When the vehicle 1 is caused to lean in relation to the perpendicular direction, the link mechanism 5 is actuated to operate.

As this occurs, the upper cross portion 51 and the lower cross portion 52 are translated horizontally in the left-and-right direction while the direction in which they extend is kept parallel or substantially parallel to the road surface G. The upper cross portion 51 and the lower cross portion 52 turn about the upper left axis M2 and the lower left axis M5, respectively, relative to the left side portion 53. Additionally, the upper cross portion 51 and the lower cross portion 52 also turn about the upper right axis M3 and the lower right axis M6, respectively, relative to the right side portion 54.

In this manner, when the vehicle is seen from the front, with the vehicle resting in the upright state, the upper cross portion 51, the lower cross portion 52, the left side portion 53, the right side portion 54 define a rectangle, and when the vehicle is caused to lean, the link mechanism 5 operates so that the rectangle changes to a parallelogram as the vehicle is caused to lean farther.

In the following description, an area where the upper cross portion 51, the lower cross portion 52, the left side portion 53, and the right side portion 54 move when the link mechanism 5 is actuated to operate will be referred to as a movable range of the link mechanism 5 from time to time.

In the present preferred embodiment, the link mechanism 50 operates so that a left end of the upper cross portion 51 moves farther horizontally leftwards than a left end of the lower cross portion 52. When the link mechanism 50 operates in this manner, the left shock absorber 33 and the right shock absorber 34 lean in relation to the perpendicular direction. When the vehicle 1 leans to the left in relation to the perpendicular direction in the manner described above, the state of the vehicle 1 changes from the state shown in FIG. 2 to the state shown in FIG. 5.

The vehicle 1 according to the present preferred embodiment is turned by causing the vehicle body to lean while the vehicle 1 is running. Additionally, the directions of the left front wheel 31 and the right front wheel 32 are also changed by operating the handlebar 23.

Next, rigidities of the upper cross portion 51 and the lower cross portion 52 will be described. In the following description, the rigidities of the upper cross portion 51 and the lower cross portion 52 (hereinafter, when both the cross portions do not have to be discriminated from each other, the upper cross portion 51 and the lower cross portion 52 are referred to simply as a cross portion) indicate the difficulty that the cross portions have in deflecting when a force acting in the front-and-rear direction of the vehicle body 21 is exerted on the cross portions.

The left front wheel 31 and the right front wheel 32 of the vehicle 1 are supported independently of each other. Because of this, there are situations in which forces that are different in magnitude are exerted on the left front wheel 31 and the right front wheel 32 at different timings. For example, when the brakes are applied or the vehicle 1 rides over irregularities on the road surface, an external force is transferred to the link mechanism 5. As this occurs, there are situations in which force components in the front-and-rear direction that are exerted on the leftmost and rightmost portions of the cross portions become different in magnitude or direction or in which the force component in the front-and-rear direction is exerted thereon at different timings. Even in such a case, the cross portions are required to have a certain resistance to deflection when a force in the front-and-rear direction is exerted thereon so as to maintain the smooth operation of the link mechanism 5. To meet this requirement, the right side portion 54, the left side portion 53, the upper cross portion 51, and the lower cross portion 52 of the vehicle 1 of the present preferred embodiment each have high rigidity to maintain the smooth operation of the link mechanism 5.

The right side portion 54, the left side portion 53, the upper cross portion 51, and the lower cross portion 52 of the link mechanism 5 are each highly rigid to enhance the function to turn smoothly and the function to transfer loads. This eventually enlarges external shapes of the right side portion 54, the left side portion 53, the upper cross portion 51, and the lower cross portion 52. This results in enlargement of the link mechanism 5 including those portions that are enlarged. Further, the movable range of the link mechanism 5 is also expanded further. The vehicle that includes the vehicle body frame 21 that can lean and two front wheels 31, 32 includes on the periphery of the steering shaft 60 a large link mechanism 5 that moves as the vehicle body frame 21 leans. Because of this, in the vehicle including the vehicle body frame 21 that can lean and two front wheels 31, 32, on-board components need to be provided so that the on-board components do not interfere with the movable range of the link mechanism 5. Because of this, in the vehicle that includes the vehicle body frame 21 that can lean and two front wheels 31, 32, the construction around the periphery of the steering shaft 60 tends to be increased in size.

Then, the inventor of preferred embodiments of the present invention analyzed in detail the function of the link mechanism 5. The link mechanism 5 includes the function to enable the right side portion 54 or the left side portion 53 to turn smoothly relative to the upper cross portion 51 and the lower cross portion 52 and the function to enable the upper cross portion 51 and the lower cross portion 52 to turn smoothly relative to the vehicle body frame 21. Additionally, the link mechanism 5 includes the function to transfer loads received by the right side portion 54 or the left side portion 53 to the vehicle body frame 21.

This analysis revealed that the load received by the link mechanism 5 includes loads in the direction of the turning axes (the upper middle axis M1, the upper left axis M2, the upper right axis M3, the lower middle axis M4, the lower left axis M5, and the lower right axis M6) of the upper cross portion 51, the lower cross portion 52, the left side portion 53, and the right side portion 54 and loads in the direction that extend in the up-and-down direction of the vehicle body frame 21 and that is vertical to the rotational axes. Further, the analysis revealed that although the ratio of assigned loads received by the link mechanism 5 to the vehicle body frame 21 that are allocated to the upper cross portion 51 and the lower cross portion 52 is changed, when both the cross portions are provided the function to operate the link mechanism 5 smoothly, the smooth operation of the link mechanism 5 is easily maintained.

Then, the analysis revealed that the shape of the upper cross portion 51 and the shape of the lower cross portion 52 are allowed to differ from each other by considering the fact that the smooth operation of the link mechanism 5 is easily maintained although the ratio of assigned loads received by the link mechanism 5 to the vehicle body frame 21 that are allocated to the upper cross portion 51 and the lower cross portion 52 is changed.

The rigidity of the cross portions of the link mechanism 5 includes a rigidity component attributed to the shape, thickness, material and the like of the cross portion itself and a rigidity component that is attributed to the type, size and the like of the upper middle bearing 511 or the lower middle bearings 521. Then, it is possible to know the rigidity of the cross portions based on displacements of the cross portions that are measured as will be described below. It is shown that the smaller the displacement, the larger the rigidity.

Figure 6A:
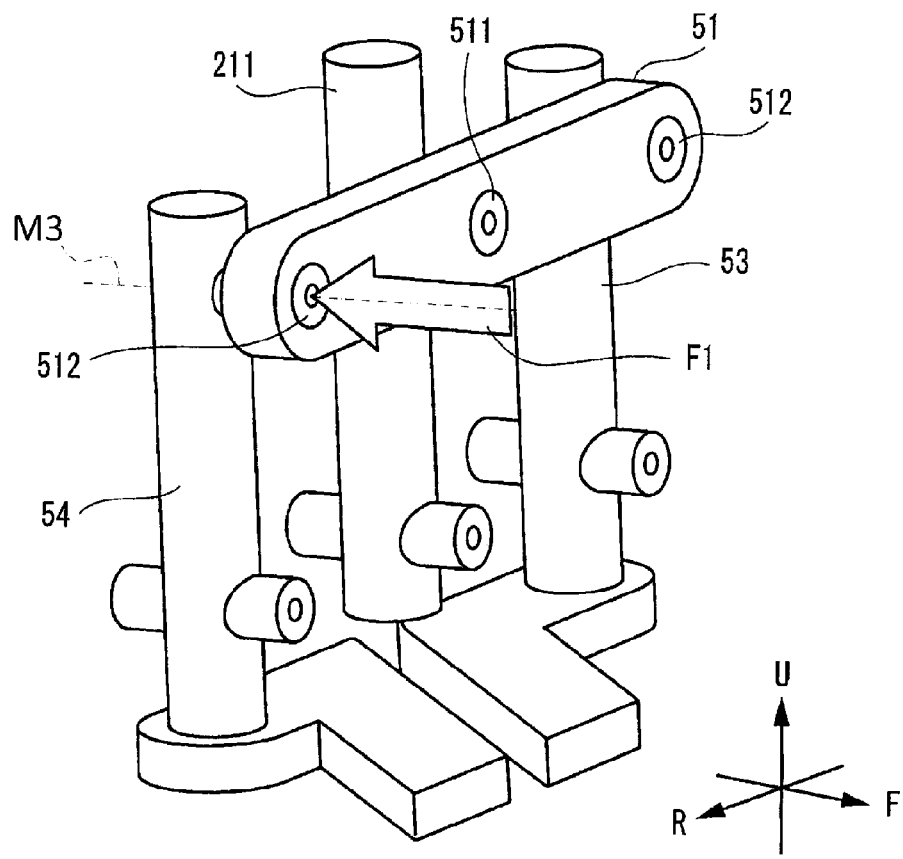
FIGS. 6A and 6B are schematic drawings showing how to measure a rigidity of an upper cross portion.
Figure 6B:
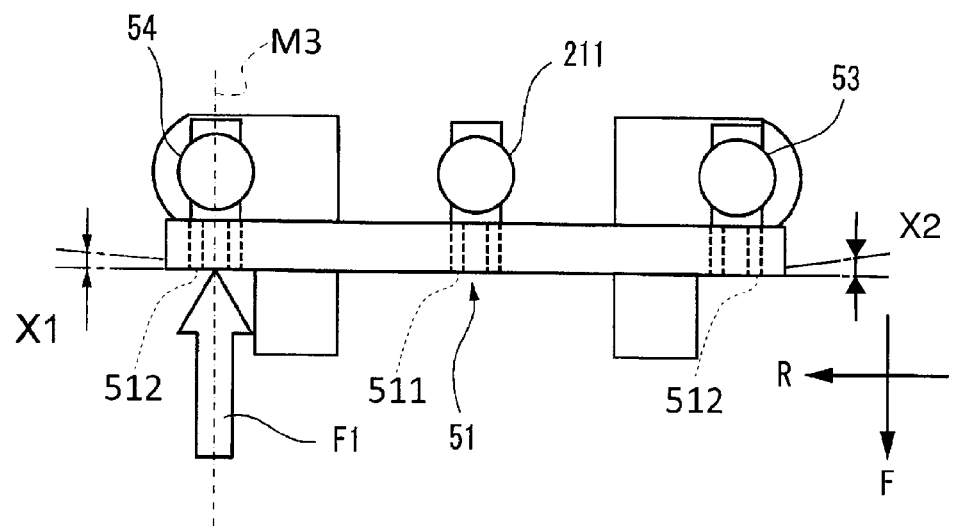
Figure 7A:
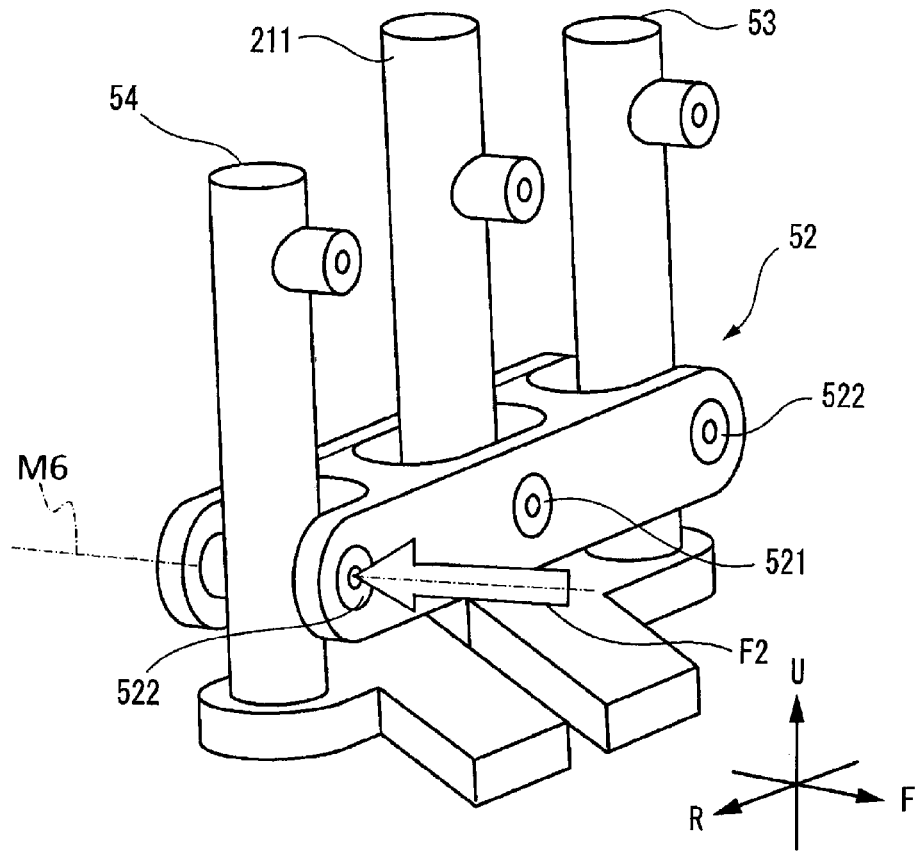
FIGS. 7A and 7B are schematic drawings showing how to measure a rigidity of a lower cross portion.
Figure 7B:
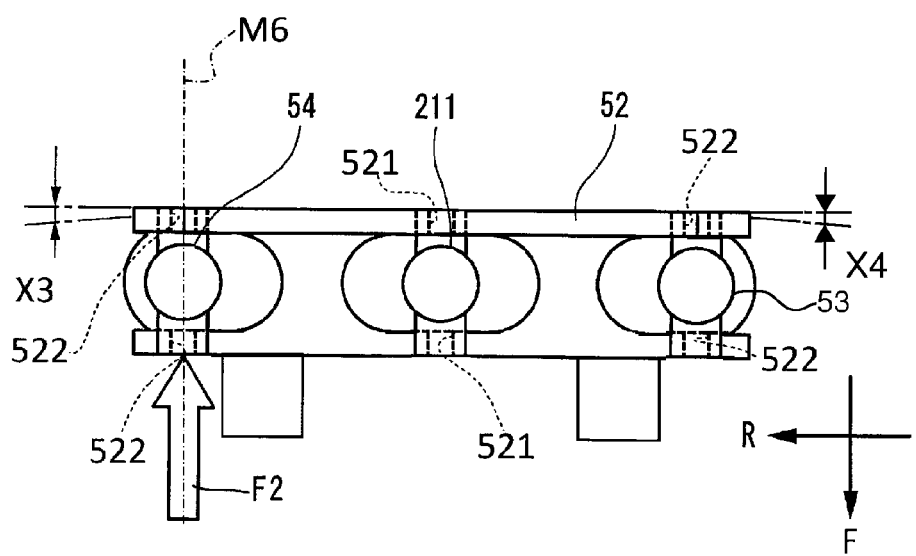

FIGS. 6A and 6B are schematic drawings showing how to evaluate the rigidity of the upper cross portion 51. FIG. 6A is a perspective view of an upper portion of the link mechanism 5, and FIG. 6B is a plan view of the upper portion of the link mechanism 5. FIGS. 7A and 7B are schematic drawings showing how to evaluate the rigidity of the lower cross portion 52. FIG. 7A is a perspective view of the upper portion of the link mechanism 5, and FIG. 7B is a plan view of the upper portion of the link mechanism 5.

As shown in FIG. 6A, the lower cross portion 52 is removed from the headstock 211. In this state, the upper middle bearing 511, the upper left bearing 512, and the upper right bearing 512 are kept mounted in the upper cross portion 51.

An upward right displacement X1 of the upper cross portion 51 is measured when a rearward test force F1 in the direction of the upper right axis M3 is exerted on the upper right bearing 512 with the lower cross portion 52 removed. Similarly, an upward left displacement X2 of the upper cross portion 51 is measured when a force that is equal or substantially equal in magnitude and direction (a rearward direction in the direction of the upper left axis M2) as the test force F1 is exerted on the upper left bearing 512 with the lower cross portion 52 removed.

Next, as shown in FIGS. 7A and 7B, the upper cross portion 51 is removed from the headstock 211. In this state, the lower middle bearings 521, the lower left bearings 522, and the lower right bearings 522 are kept mounted in the lower cross portion 52. A lower right displacement X3 of the lower cross portion 52 is measured when a (rearward) force F2 (in the direction of the lower right axis M6) that is equal or substantially equal in magnitude and direction as the test force F1 is exerted on the lower right bearing 522 with the upper cross portion 51 removed. A lower left displacement X4 of the lower cross portion 52 is measured when a (rearward) force (in the direction of the lower left axis M5) that is equal or substantially equal in magnitude and direction as the test force F2 is exerted on the lower left bearing 522 with the upper cross portion 51 removed.

As in the upper left bearing 512 and the lower left bearing 522 or the upper right bearing 512 and the lower right bearing 522, the test force is exerted only on one of the left and right bearings of the upper cross portion 51 and the lower cross portion 52. By doing so, a force that is exerted on the upper cross portion 51 and the lower cross portion 52 when the brakes are applied or the vehicle rides over irregularities on the road surface is simulated.

In the vehicle 1 of the present preferred embodiment, it is configured so that when the upper right displacement X1, the upper left displacement X2, the lower right displacement X3, and the lower left displacement X4 are measured in the manner described above, the upper right displacement X1 and the upper left displacement X2 of the upper cross portion 51 are equal or substantially equal to each other, the lower right displacement X3 and the lower left displacement X4 of the lower cross portion 52 are equal or substantially equal to each other, the upper right displacement X1 of the upper cross portion 51 and the lower right displacement X3 of the lower cross portion 52 are different from each other, and the upper left displacement X2 of the upper cross portion 51 and the lower left displacement X4 of the lower cross portion 52 are different from each other. Additionally, the shape of the upper cross portion 51 differs from the shape of the lower cross portion 52.

Specifically, in the present preferred embodiment, the upper right displacement X1 and the upper left displacement X2 of the upper cross portion 51 are equal or substantially equal to each other. The lower right displacement X3 and the lower left displacement X4 of the lower cross portion 52 are equal or substantially equal to each other. The upper right displacement X1 of the upper cross portion 51 is larger than the lower right displacement X3 of the lower cross portion 52. The upper left displacement X2 of the upper cross portion 51 is larger than the lower left displacement X4 of the lower cross portion 52. Additionally, the shape of the upper cross portion 51 is smaller than the shape of the lower cross portion 52.

In the vehicle 1 of the present preferred embodiment, thicknesses in the front-and-rear direction and the up-and-down direction of the upper cross portion 51 are equal or substantially equal to corresponding thicknesses of the front lower cross portion 52a1 and the rear lower cross portion 52a2 of the lower cross portion 52, and the same or similar bearing is used for the upper middle bearing 511 and the lower middle bearings 521.

Additionally, the upper cross portion 51 does not include a member that corresponds to the connecting portion 52b of the lower cross portion 52. Further, the upper middle bearing 511 disposed only forward of the headstock 211. In contrast with this, the lower middle bearings 521 are provided both at a front and rear sides of the headstock 211. Since the lower cross portion 52 is supported by the lower middle bearings 521 at two locations in the front-and-rear direction, the displacements X1, X2 may be larger than twice the displacements X3, X4, respectively.

In addition, by using any one of the following configurations (1) to (3), the displacements X1, X2 of the upper cross portion 51 become larger than the displacements X3, X4 of the lower cross portion 52. (1) The upper cross portion 51 is larger than the front lower cross portion 52a1 that defines the front portion of the lower cross portion. (2) The upper middle bearing 511 of the upper cross portion 51 is larger than the lower middle bearings 521 of the lower cross portion 52. (3) The upper middle bearing 511 of the upper cross portion 51 includes a plurality of bearings.

In the description above, the rearward test force F1 is preferably exerted on the upper cross portion 51, and the rearward test force F2 is preferably exerted on the lower cross portion 52. However, a forward test force F1 may be exerted on the upper cross portion 51, and a forward test force F2 may be exerted on the lower cross portion 52. When the test forces that act in opposite directions in relation to the front-and-rear direction are exerted on the upper cross portion 51 and the lower cross portion 52, the above loads in the front-and-rear direction that are exerted on the cross portions when the brakes are applied or the vehicle rides over the irregularities on the road surface are simulated.

According to the vehicle of the present preferred embodiment, the movable range of the link mechanism 5 is changed from a simple shape like a rectangular parallelepiped to an irregular shape by changing the ratio of assigned loads received by the link mechanism 5 including the upper cross portion 51 and the lower cross portion 52 to the vehicle body frame 21 and making the shape of the upper cross portion 51 that includes the portion that supports the right side portion 54 and the left side portion 53 and that is supported on the vehicle body frame 21 and the shape of the lower cross portion 52 that includes the portion that supports the right side portion 54 and the left side portion 53 and that is supported on the vehicle body frame 21 differ from each other. This enhances the degree of freedom in designing the periphery of the steering shaft 60. As a result of this, even though various on-board components that differ in size and the link mechanism 5 are disposed on the periphery of the steering shaft 60, it is possible to prevent enlargement of the periphery of the steering shaft 60. Moreover, the upper cross portion 51 and the lower cross portion 52 are each configured to include the portion that supports the right side portion 54 and the left side portion 53 and that is supported on the vehicle body frame 21, and the shape of the upper cross portion 51 that includes the portion is different from the shape of the lower cross portion 52 that includes the portion. With this configuration, even though the ratio of assigned loads that are allocated between the upper cross portion 51 and the lower cross portion 52 is changed, the smooth operation of the link mechanism 5 is easily maintained.

Consequently, in the vehicle that includes the vehicle body frame 21 that can lean and two front wheels 31, 32, it is possible to prevent enlargement in size of the construction on the periphery of the steering shaft 60 located above the two front wheels 31, 32 while maintaining the function of the link mechanism 5.

Specifically, the upper cross portion 51 preferably includes a single plate-shaped member, and as shown in FIG. 4, no member of the link mechanism 5 is provided at a rear upper portion of the link mechanism 5. This enables an upper portion of the space where the link mechanism 5 operates (the movable range of the link mechanism) to be smaller than the movable range of the link mechanism of Japanese Patent Unexamined Publication JP-A-2005-313876. Then, the vehicle body frame or accessories are disposed in the space defined in the rear upper portion of the link mechanism 5. Alternatively, the front cover 221 may be designed to be simply smaller in size by an area corresponding to the rear upper space to enhance the external design thereof. Here, accessories include a hydraulic unit of ABS (Antilock Braking System), headlamp, horn, turn signals, radiator, battery, anti-theft device, brake hose, brake wire, fasteners for brake hose and brake wire, body cover, various meters, and the like.

As a result of the front cover 221 being designed smaller, a member of the vehicle body frame is designed to be large or an additional member is disposed in the space defined at the rear upper portion of the link mechanism 5 in the space defined at the front portion of the vehicle, such that it is possible to enhance the rigidity of the vehicle.

Alternatively, the rear upper space may be used as a space where indicators such as a speedometer, lamps, a main switch and the like are disposed or storage space. By doing so, positions where to dispose equipment at the front portion of the vehicle are freely designed. Additionally, it is also possible to improve the external design.

Further, to express the configuration described above in a different manner, according to a preferred embodiment of the present invention, the lower cross portion 52 includes the front lower cross portion 52a1 and the rear lower cross portion 52a2 that are disposed so as to hold the headstock 211 therebetween, and the upper cross portion 51 includes a single plate-shaped member. Then, the shape of the lower cross portion 52 is larger than the shape of the upper cross portion 51. In particular, the lower cross portion 52 is large by using of the space on the periphery of the lower portion of the link mechanism 5, and the rigidity of the lower cross portion 52 is larger than the rigidity of the upper cross portion 51.

In this manner, in a preferred embodiment of the present invention, the rigidity of the link mechanism 5 is unbalanced between the upper portion and the lower portion of the link mechanism 5. Since the lower cross portion 52 bears most of the rigidity that is required of the link mechanism 5, compared with the design concept of sharing equally the rigidity required of the link mechanism 5 between the upper portion and the lower portion of the link mechanism 5, the upper cross portion 51 is smaller in shape than the lower cross portion 52 by making the upper cross portion 51 of a single plate-shaped member. This allows the upper portion of the link mechanism 5 to be small, and therefore, the space defined on the periphery of the upper portion of the link mechanism 5 may be used as the space where the vehicle body frame and the accessories are disposed or as the space to enhance the external design of the vehicle.

In this manner, the function to ensure the rigidity that is required of the link mechanism 5 is assigned mainly to the lower portion of the link mechanism 5, while the guiding function to make the upper portion of the left side portion 53 and the upper portion of the right side portion 54 work in cooperation with each other is assigned to the upper portion of the link mechanism 5. Thus, noticing that the smooth operation of the link mechanism 5 is easily maintained although different functions are assigned to the upper portion and the lower portion of the link mechanism 5, preferred embodiments of the present invention have been developed based on this knowledge that the space utilization efficiency at the front portion of the vehicle is enhanced by making the shape of the upper portion and the lower portion of the link mechanism 5 different from each other.

In particular, the indicators and the vehicle body frame are disposed densely behind the headstock 211 in many cases. Because of this, no member of the upper cross portion 51 is provided on the headstock 211 since the space behind the headstock 211 is effectively used for other applications. For example, the front frame 212 may be connected directly to the headstock 211 without interposing a support member or the like therebetween, thus making it possible to enhance the rigidity of the front frame 212 and the headstock 211.

Additionally, the upper cross portion 51, the lower cross portion 52, the left side portion 53, and the right side portion 54 of the link mechanism 5 are supported turnably by the bearings. This enhances the rigidity of the link mechanism 5.

In the vehicle according to a preferred embodiment, the upper right displacement X1 of the upper cross portion 51 is larger than the lower right displacement X3 of the lower cross portion 52, and the upper left displacement X2 of the upper cross portion 51 is larger than the lower left displacement X4 of the lower cross portion 52. Additionally, the shape of the upper cross portion 51 is smaller than the shape of the lower cross portion 52.

According to the vehicle of a preferred embodiment, the movable range of the link mechanism 5 is changed from a simple shape like a rectangular parallelepiped to a shape in which the upper portion is small by making the shape of the upper cross portion 51 that includes the portions that support the right side portion 54 and the left side portion 53 and that is supported on the vehicle body frame 21 smaller than the shape of the lower cross portion 52 that includes the portions that support the right side portion 54 and the left side portion 53 and that is supported on the vehicle body frame 21. This enhances the degree of freedom in designing an upper peripheral portion of the steering shaft 60. The ratio of the assigned loads allocated to the upper cross portion 51 having a small shaped is reduced, while the ratio of the assigned loads allocated to the lower cross portion 52 having a larger shape is increased, and therefore, the balance between rigidity and shape is easily controlled. This enhances the degree of freedom in designing the upper peripheral portion of the steering shaft 60. As a result of this, even though various on-board components having different sizes and the link mechanism 5 are disposed on the periphery of the steering shaft 60, it is possible to prevent enlargement of the periphery of the steering shaft 60. Moreover, the smooth operation of the link mechanism 5 is easily maintained only by changing the ratio of assigned loads that are allocated to the upper cross portion 51 that includes the portions that support the right side portion 54 and the left side portion 53 and that is supported on the vehicle body frame 21 and the lower cross portion 52 that includes the portions that support the right side portion 54 and the left side portion 53 and that is supported on the vehicle body frame 21 while both the upper cross portion 51 and the lower cross portion 52 are provided the function to operate the link mechanism 5 smoothly.

Consequently, in the vehicle that includes the vehicle body frame 21 that can lean and two front wheels 31, 32, it is possible to prevent enlargement in size of the peripheral construction of the steering shaft 60 located above the two front wheels 31, 32 while maintaining the function of the link mechanism 5.

When referred to herein, the shape of the upper cross portion 51 indicates a shape that is defined by an outer shape of the upper cross portion 51, and the shape of the lower cross portion 52 indicates a shape that is defined by an outer shape of the lower cross portion 52. The outer shape of the upper cross portion 51 indicates an outer edge of an area that is defined by a surface of the upper cross portion 51 that makes up a movable range of the upper cross portion 51 when the link mechanism 5 operates. The outer shape of the lower cross portion 52 indicates an outer edge of an area that is defined by a surface of the lower cross portion 52 that makes up a movable range of the lower cross portion 52 when the link mechanism 5 operates.

For example, surfaces that define outlines of the left and right end portions of the upper cross portion 51 when seen in the direction of the upper middle axis M1 make up left and right surfaces of the movable range of the upper cross portion 51. Because of this, the surfaces that define the outlines of the left and right end portions of the upper cross portion 51 when seen in the direction of the upper middle axis M1 affect the shape of the upper cross portion 51. Contrary to this, wall portions that define through holes that are provided in the upper cross portion 51 to dispose the upper middle bearing 511, the upper right bearing 512, and the upper left bearing 512 are not surfaces that make up the movable range of the upper cross portion. Thus, the wall portions that define the through holes do not affect the shape of the upper cross portion 51. In addition to these wall portions, surfaces of recessed portions that are provided to reduce the weight of the upper cross portion 51 only and that do not affect the movable range of the upper cross portion 51 do not affect the shape of the upper cross portion 51.

In the vehicle according to a preferred embodiment, a material of the upper cross portion 51 that includes the portions that support the right side portion 54 and the left side portion 53 and that is supported on the vehicle body frame 21 is preferably the same as a material of the lower cross portion 52 that includes the portions that support the right side portion 54 and the left side portion 53 and that is supported on the vehicle body frame 21.

According to a preferred embodiment of the present invention, the material of the upper cross portion 51 and the material of the lower cross portion 52 are preferably the same, and therefore, the balance between rigidity and shape is easily controlled. This enhances the degree of freedom in designing the periphery of the steering shaft 60. As a result of this, even though various on-board components having different sizes and the link mechanism 5 are disposed on the periphery of the steering shaft 60, it is possible to prevent further enlargement of the periphery of the steering shaft 60. Moreover, although the ratio of assigned loads are allocated between the upper cross portion 51 and the lower cross portion 52 is changed by making the shape of the upper cross portion 51 differ from the shape of the lower cross portion 52, it is easy to maintain the smooth operation of the link mechanism 5.

Consequently, in the vehicle that includes the vehicle body frame 21 that can lean and two front wheels 31, 32, it is possible to prevent enlargement in size of the peripheral construction of the steering shaft 60 located above the two front wheels 31, 32 while maintaining the function of the link mechanism 5.

According to a preferred embodiment of the present invention, the lower cross portion 52 includes the front lower cross portion 52a1 (an example of a lower front portion) located forward of the headstock 211 in the direction of the lower right axis M6 and the rear lower cross portion 52a2 (an example of a lower rear portion) located rearward of the headstock 211 in the same direction.

According to a preferred embodiment of the present invention that includes the vehicle body frame 21 that can lean and two front wheels 31, 32, since the lower cross portion 52 includes the front lower cross portion 52a1 located forward of the headstock 211 and the rear lower cross portion 52a2 located rearward of the headstock 211, it is easy to control the balance between rigidity and shape in the lower cross portion 52. This enhances the degree of freedom in designing the peripheral lower portion of the steering shaft 60. This enhances the degree of freedom in designing the space on the periphery of the rear portion of the lower cross portion 52. As a result of this, even though various on-board components having different sizes and the link mechanism 5 are disposed on the periphery of the steering shaft 60, it is possible to prevent further enlargement of the periphery of the steering shaft 60.

According to a preferred embodiment of the present invention, the vehicle body frame 21 includes the headstock 211 that turnably supports the upper cross portion 51 and the lower cross portion 52. The upper cross portion 51 is provided forward of the headstock 211 and no such member is provided behind the headstock 211.

According to a preferred embodiment of the present invention that includes the vehicle body frame 21 that can lean and two front wheels 31, 32, the upper cross portion 51 is provided only at the front of the headstock 211, and therefore, the movable range of the link mechanism 5 is changed from a simple shape like a rectangular parallelepiped to an irregular shape in which an upper portion is smaller than a lower portion. This enhances the degree of freedom in designing the periphery of the steering shaft 60. As a result of this, even though various on-board components that differ in size and the link mechanism 5 are disposed on the periphery of the steering shaft 60, it is possible to prevent enlargement of the periphery of the steering shaft 60.

Different from the preferred embodiments described above, a configuration may be used in which the upper cross portion 51 is provided rearward of the headstock 211, and no such member is provided forward of the headstock 211. Even with this configuration, as with the configuration of the preferred embodiments described above, the movable range of the link mechanism 5 is made into the irregular shape in which the upper portion is smaller than the lower portion.

Alternatively, a configuration may be used in which the lower cross portion 52 is provided either forward of or rearward of the headstock 211 and does not have to be provided in both locations. This configuration allows the movable range of the link mechanism 5 to have an irregular shape in which a lower portion is smaller than an upper portion.

According to a preferred embodiment of the present invention, the front end of the upper cross portion 51 and the front end of the lower cross portion 52 are provided in different positions in relation to the direction of the upper right axis M3.

According to a preferred embodiment of the present invention that includes the vehicle body frame 21 that can lean and two front wheels 31, 32, since the front end of the upper cross portion 51 and the front end of the lower cross portion 52 are provided in different positions in relation to the direction of the upper right axis M3, the movable range of the link mechanism 5 is changed from a simple shape like a rectangular parallelepiped to a shape that is irregular in the front-and-rear direction. This enhances the degree of freedom in designing the periphery of the steering shaft 60. As a result of this, even though various on-board components that differ in size and the link mechanism 5 are disposed on the periphery of the steering shaft 60, it is possible to prevent enlargement of the periphery of the steering shaft 60.

Similarly, a rear end of the upper cross portion 51 and a rear end of the lower cross portion 52 may be provided in different positions in relation to the direction of the upper right axis M3. Since the rear end of the upper cross portion 51 and the rear end of the lower cross portion 52 are provided in different positions in relation to the direction of the upper right axis M3, the movable range of the link mechanism 5 is changed from a simple shape like a rectangular parallelepiped to a shape that is irregular in the front-and-rear direction. This enhances the degree of freedom in designing the periphery of the steering shaft 60. As a result of this, even though various on-board components that differ in size and the link mechanism 5 are disposed on the periphery of the steering shaft 60, it is possible to prevent enlargement of the periphery of the steering shaft 60.

According to a preferred embodiment of the present invention, the headstock 211 that defines a portion of the vehicle body frame 21 turnably supports the steering shaft 60.

According to a preferred embodiment of the present invention that includes the vehicle body frame 21 that can lean and two front wheels 31, 32, the headstock 211 supports the link mechanism 5 that supports, in turn, the right front wheel 32, the left front wheel 31, the right shock absorber 34, and the left shock absorber 33 and has a high rigidity. This enables the steering shaft 60 to be supported by using the high rigidity of the headstock 211, such that the configuration that supports the steering shaft 60 is simplified. As a result, it is possible to prevent enlargement of the peripheral construction of the steering shaft 60.

Thus, while the present invention has been described heretofore with references to the preferred embodiments described above, the technical scope of the present invention is not limited by the scope that is descriptively defined in the preferred embodiments. It should be clear to those skilled in the art to which the present invention pertains that various alterations or improvements may be made to the preferred embodiments.

For example, the volume of the upper cross portion 51 may be the same as or different from the volume of the lower cross portion 52 as long as the displacement X1 is equal or substantially equal to the displacement X2, the displacement X3 is equal or substantially equal to the displacement X4, the displacement X1 is different from the displacement X3, the displacement X2 is different from the displacement X4, and the shape of the upper cross portion 51 is different from the shape of the lower cross portion 52. Alternatively, the weight of the upper cross portion 51 may be the same as or different from the weight of the lower cross portion 52 as long as the displacement X1 is equal or substantially equal to the displacement X2, the displacement X3 is equal or substantially equal to the displacement X4, the displacement X1 is different from the displacement X3, the displacement X2 is different from the displacement X4, and the shape of the upper cross portion 51 is different from the shape of the lower cross portion 52. Alternatively, the material of the upper cross portion 51 may be the same as or different from the material of the lower cross portion 52 as long as the displacement X1 is equal or substantially equal to the displacement X2, the displacement X3 is equal or substantially equal to the displacement X4, the displacement X1 is different from the displacement X3, the displacement X2 is different from the displacement X4, and the shape of the upper cross portion 51 is different from the shape of the lower cross portion 52.

For example, in the preferred embodiments described above, the upper cross portion 51 and the lower cross portion 52 are described as being made of the same material and having the different shapes so that the displacement X1 is different from the displacement X3 and that the displacement X2 is different from the displacement X4. However, the approach to making the displacement X1 differ from the displacement X3 and the displacement X2 differ from the displacement X4 is not limited to that in the preferred embodiments described above. For example, the lower cross portion 52 may be made of a material having a Young's modulus that is larger than that of the material of the upper cross portion 51. By this approach, too, it is easy to set the displacements X1, X2 of the upper cross portion 51 to be larger than the displacements X3, X4 of the lower cross portion 52. For example, by using a material having a large Young's modulus for the upper cross portion 51 and a material having a small Young's modulus for the lower cross portion 52, compared with the case where the upper cross portion 51 and the lower cross portion 52 are made of the same material, the upper cross portion 51 is smaller in size. This enhances the degree of freedom in designing the space on the periphery of the upper cross portion 51.

In addition, in the preferred embodiments described above, the plate members having the same shape are described as being used for both the upper cross portion 51 and the lower cross portion 52, and in order to provide different shapes to the upper cross portion 51 and the lower cross portion 52, the upper cross portion 51 is described as including one plate member, while the lower cross portion 52 includes two plate members. However, the approach to providing different shapes to the upper and lower cross portions is not limited thereto. For example, a configuration may be used in which the upper cross portion 51 includes one plate member and the lower cross portion 52 includes one member having an I-shaped cross section (whose sectional area is the same as that of the plate member). By using this configuration, the displacements X1, X2 of the upper cross portion 51 are larger than the displacements X3, X4 of the lower cross portion 52.

In addition to this, as the approach to providing different shapes to the upper cross portion 51 and the lower cross portion 52, it is possible to provide different sectional areas or sectional shapes to the upper and lower cross portions or provide or not provide a reinforcement rib to enhance the rigidity thereof. By using this configuration, the displacement X1 and the displacement X3 are different from each other, and the displacement X2 and the displacement X4 are different from each other. It is noted that when referred to herein, the description that the shapes of the upper cross portion and the lower cross portion differ indicates that a difference in shape that does not largely affect the rigidity of the cross portions is not included in the difference in shape that is referred to above. The materials, weights, or volumes of the upper cross portion and the lower cross portion may be different or the same as long as the shape of the upper cross portion differs from the shape of the lower cross portion.

In a preferred embodiment of the present invention, the upper cross portion and the lower cross portion may be the same material and be different in shape. By making one of the upper cross portion and the lower cross portion so as to have a larger shape than that of the other in order to ensure the rigidity of the one, it is easy to enhance the degree of freedom in designing the peripheral space of the other.

According to a preferred embodiment of the present invention, the upper cross portion and the lower cross portion may be different in material as well as in shape. According to a preferred embodiment of the present invention, it is possible to enhance both the degree of freedom in designing the link mechanism and the degree of freedom in designing the peripheral space of the link mechanism. For example, by using a material having a higher rigidity than that of the material used for the cross portion having the smaller displacement for the cross portion having the larger displacement, the shape of the cross portion having the larger displacement is smaller in size to enhance further the degree of freedom in designing the peripheral space of the cross portion having the larger displacement.

According to a preferred embodiment of the present invention, as the example in which the rigidity of the upper cross portion 51 is substantially different from that of the lower cross portion 52, the rigidity of the lower cross portion 52 is set to be larger than the rigidity of the upper cross portion 51. According to a preferred embodiment of the present invention, the rear upper space of the link mechanism 5 is described as being used for other applications including the application in which accessories are disposed in the space, the present invention is not limited thereto. For example, a configuration may be used in which a single upper cross portion 51 is provided behind the headstock 211, so that a front upper space of the link mechanism 5 may be used for other applications.

In addition, a configuration may be used in which the link mechanism 5 is constructed upside down compared with the construction in the preferred embodiments described above. In other words, a configuration may be used in which an upper cross portion 51 includes two cross portions, that is, a front upper cross portion and a rear upper cross portion that are provided so as to hold the headstock 211 from the front and rear therebetween, while a single lower cross portion 52 is provided only either forward of or rearward of the headstock 211. As this occurs, either the front lower portion or the rear lower portion of the link mechanism 5 may be used for other applications.

Additionally, in the preferred embodiments described above, while the link mechanism 5 is described as including the upper cross portion 51 and the lower cross portion 52, the present invention is not limited thereto. For example, as the link mechanism, a link mechanism may be used which is configured to include three or more cross portions such as a link mechanism including an upper cross portion, a lower cross portion, and a middle cross portion that is provided between the upper cross portion and the lower cross portion.

In addition, in the preferred embodiments described above, while the upper cross portion 51 and the lower cross portion 52 are described as being mounted on the headstock 211 that turnably supports the steering shaft 60, the present invention is not limited thereto. For example, the upper cross portion 51 and the lower cross portion 52 may be mounted at a location that extends upwards and forwards from the front frame 212 or a member that is mounted on the front frame 212 so as to extend upwards and forwards.

Additionally, while the front lower cross portion 52a1 and the rear lower cross portion 52a2 that are provided at the front and rear of the lower cross portion 52 are described as being connected individually to the left side portion 53 and the right side portion 54 via the lower left bearings 522 and the lower right bearings 522, the present invention is not limited thereto. Only one of the front lower cross portion 52a1 and the rear lower cross portion 52a2 may be connected to the left side portion 53 and the right side portion 54. However, the front lower cross portion 52a1 and the rear lower cross portion 52a2 that are provided at the front and rear of the lower cross portion 52 are preferably connected individually to the left side portion 53 and the right side portion 54, thus making it possible to enhance the rigidity of the lower cross portion 52.

In the preferred embodiments described above, as shown in FIG. 4, the lower cross portion 52 includes the front lower cross portion 52a1 and the rear lower cross portion 52a2 that are connected, respectively, to the front and rear of the headstock 211 in such a manner as to hold the headstock 211 therebetween in the front-and-rear direction of the vehicle body frame 21. Additionally, the upper cross portion 51 is provided only at the front of the headstock 211 in relation to the front-and-rear direction of the vehicle body frame 21. However, the present invention is not limited thereto.

Figure 8:
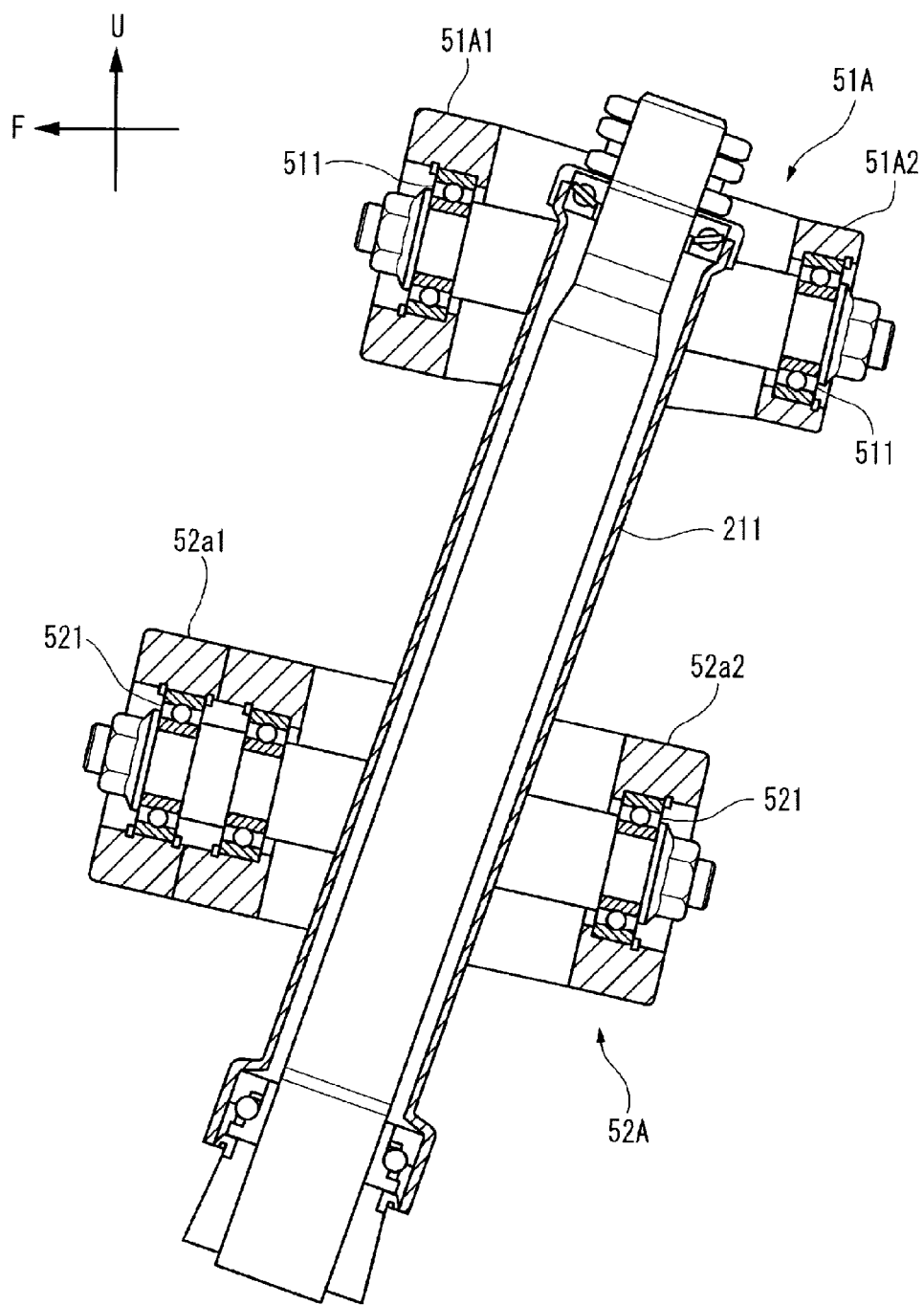
FIG. 8 is a drawing similar to FIG. 4 and shows a vehicle according to a modified example of a preferred embodiment of the present invention.

For example, as shown in FIG. 8, a configuration may be used in which an upper cross portion 51A includes a front upper cross portion 51A1 and a rear upper cross portion 51A2 that are individually connected to a headstock 211 in such a manner as to hold the headstock 211 therebetween in a front-and-rear direction of a body frame 21. In this case, the front upper cross portion 51A1 is larger than the rear upper cross portion 51A2. By using this configuration, compared with a case where the front upper cross portion 51A1 is substantially as large as the rear upper cross portion 51A2, it is possible to enhance the degree of freedom in designing the location where the upper cross portion 51A is connected to the headstock 211 of a front frame 212. Also in the configuration shown in FIG. 8, it is set so that an upper right displacement X1 and an upper left displacement X2 are equal or substantially equal to each other, a lower right displacement X3 and a lower left displacement X4 are equal or substantially equal to each other, the upper right displacement X1 and the lower right displacement X3 are different from each other, the upper left displacement X2 and the lower left displacement X4 are different from each other, and a shape of the upper cross portion 51A differs from a shape of the lower cross portion 52A.

In the example shown in FIG. 8, the upper right displacement X1 is larger than the lower right displacement X3, the upper left displacement X2 is larger than the lower left displacement X4, and the shape of the upper cross portion 51A is smaller than the shape of the lower cross portion 52A.

In the vehicle shown in FIG. 8, the vehicle body frame 21 includes the headstock 211 that turnably supports the upper cross portion 51A and the lower cross portion 52A. A shape of the front upper cross portion 51A1 located forward of the headstock 211 and a shape of the rear upper cross portion 51A2 located rearward of the headstock 211 in relation to the direction of an upper right axis M3 are different from each other. Specifically, the shape of the front upper cross portion 51A1 is larger than that of the rear upper cross portion 51A2.

According to a preferred embodiment of the present invention that includes the vehicle body frame 21 that can lean and two front wheels 31, 32, the shape of the front portion of the upper cross portion 51 located forward of a link supporting portion is different from the shape of the rear portion of the upper cross portion located rearward of the link supporting portion, and therefore, a movable range of a link mechanism 5 is changed from a simple shape like a rectangular parallelepiped to an irregular shape in which an upper rear portion is smaller than the other area. This enhances the degree of freedom in designing peripheral space at the rear portion of the upper cross portion 51. As a result of this, even though various on-board components having different sizes and the link mechanism 5 are disposed on the periphery of the steering shaft 60, it is possible to prevent enlargement of the periphery of the steering shaft 60.

In a preferred embodiment of the present invention, the vehicle body frame 21 includes the headstock 211 that turnably supports the upper cross portion 51 and the lower cross portion 52. A shape of a front lower cross portion 52a1 located forward of the headstock 211 and a shape of a rear lower cross portion 52a2 located rearward of the headstock 211 in relation to the direction of a lower right axis M6 are different from each other. Specifically, the shape of the front lower cross portion 52a1 is larger than that of the rear lower cross portion 52a2.

According to a preferred embodiment of the present invention that includes the vehicle body frame 21 that can lean and two front wheels 31, 32, the shape of the front portion of the lower cross portion 52 located forward of the link supporting portion is different from the shape of the rear portion of the lower cross portion located rearward of the link supporting portion, and therefore, the movable range of the link mechanism 5 is changed from a simple shape like a rectangular parallelepiped to an irregular shape in which a lower rear portion is smaller than the other area. This enhances the degree of freedom in designing the space on the periphery of the rear portion of the lower cross portion 52. As a result of this, even though various on-board components having different sizes and the link mechanism 5 are disposed on the periphery of the steering shaft 60, it is possible to prevent enlargement of the periphery of the steering shaft 60.

In a preferred embodiment of the present invention, the upper cross portion 51 includes the front upper cross portion 51A1 located forward of the headstock 211 in the direction of the upper right axis M3 and the rear upper cross portion 51A2 located rearward of the headstock 211 in the same direction.

According to a preferred embodiment of the present invention that includes the vehicle body frame 21 that can lean and two front wheels 31, 32, since the upper cross portion 51 includes the front upper cross portion 51A1 located forward of the headstock 211 and the piece of rear upper cross portion 51A2 located rearward of the headstock 211, it is easy to control the balance between rigidity and shape in the upper cross portion 51. This enhances the degree of freedom in designing the peripheral lower portion of the steering shaft 60. This enhances the degree of freedom in designing the peripheral space of the lower cross portion 52. As a result of this, even though various on-board components having different sizes and the link mechanism 5 are disposed on the periphery of the steering shaft 60, it is possible to prevent enlargement of the periphery of the steering shaft 60.

Alternatively, on the contrary to the preferred embodiments described above, in a preferred embodiment of the present invention, the lower right displacement X3 of the lower cross portion 52 may be larger than the upper right displacement X1 of the upper cross portion 51, the lower left displacement X4 of the lower cross portion 52 may be larger than the upper left displacement X2 of the upper cross portion 51, and the shape of the lower cross portion 52 may be smaller than the shape of the upper cross portion 51.

According to a preferred embodiment of the present invention, the movable range of the link mechanism 5 is changed from a simple shape like a rectangular parallelepiped to a shape in which the lower portion is small by making the shape of the lower cross portion 52 that includes the portions that support the right side portion 54 and the left side portion 53 and that is supported on the vehicle body frame 21 smaller than the shape of the upper cross portion 51 that includes the portions that support the right side portion 54 and the left side portion 53 and that is supported on the vehicle body frame 21. This enhances the degree of freedom in designing the peripheral lower portion of the steering shaft 60. The ratio of the assigned loads allocated to the lower cross portion 52 having a small shape is reduced, while the ratio of the assigned loads allocated to the upper cross portion 51 having a large shape is increased, and therefore, the balance between rigidity and shape is easily controlled. This enhances the degree of freedom in designing the peripheral lower portion of the steering shaft 60. As a result of this, even though various on-board components having different sizes and the link mechanism 5 are disposed on the periphery of the steering shaft 60, it is possible to prevent enlargement of the periphery of the steering shaft 60. Moreover, the smooth operation of the link mechanism 5 is maintained only by changing the ratio of assigned loads that are allocated between the upper cross portion 51 and the lower cross portion 52 while the upper cross portion 51 and the lower cross portion 52 maintain the function to cause the link mechanism 5 to operate smoothly.

Consequently, in the vehicle that includes the vehicle body frame 21 that can lean and two front wheels 31, 32, it is possible to prevent enlargement in size of the peripheral construction of the steering shaft 60 located above the two front wheels 31, 32 while maintaining the function of the link mechanism 5.

Alternatively, in a preferred embodiment of the present invention, the material of the upper cross portion 51 may be different from the material of the lower cross portion 52. The material of the upper cross portion 51 or the material of the lower cross portion 52 is changed, and therefore, a range for controlling the balance between rigidity and shape is expanded. For example, by making the upper cross portion 51 to have a rigidity smaller than that of the lower cross portion 52, the shape of the upper cross portion 51 is made smaller. This enhances the degree of freedom in designing the periphery of the steering shaft 60. As a result of this, even though various on-board components having different sizes and the link mechanism 5 are disposed on the periphery of the steering shaft 60, it is possible to prevent enlargement of the periphery of the steering shaft 60. Moreover, although the ratio of assigned loads that are allocated between the upper cross portion 51 and the lower cross portion 52 is changed by making the shape of the upper cross portion 51 different from the shape of the lower cross portion 52, it is easy to maintain the smooth operation of the link mechanism 5.

Consequently, in the vehicle that includes the vehicle body frame 21 that can lean and two front wheels 31, 32, it is possible to prevent enlargement in size of the peripheral construction of the steering shaft 60 located above the two front wheels 31, 32 while maintaining the function of the link mechanism 5.

Additionally, the link supporting portion may include a single portion or a plurality of portions. In the case of the link supporting portion being made up of a plurality of portions, the portions may be joined together through welding, bonding or the like. Alternatively, the portions may be joined together with fastening members such as bolts, rivets or the like.

The upper cross portion may include an upper front cross member including a single portion, an upper rear cross member includes a single portion, and a connecting member provided between the upper front and rear cross members and that includes a plurality of portions. In the case of the link supporting portion being made up of a plurality of portions, the portions may be joined together through welding, bonding or the like. Alternatively, the portions may be joined together with fastening members such as bolts, rivets or the like.

The lower cross portion may include a lower front cross member that includes a single portion, a lower rear cross member that includes a single portion, and a connecting member provided between the lower front and rear cross portions and that includes a plurality of portions. In the case of the link supporting portion being made up of a plurality of portions, the portions may be joined together through welding, bonding or the like. Alternatively, the portions may be joined together with fastening members such as bolts, rivets or the like.

Additionally, the right side portion and the left side portion may each include a single portion or a plurality of portions. In the case of the link supporting portion being made up of a plurality of portions, the portions may be joined together through welding, bonding or the like. Alternatively, the portions may be joined together with fastening members such as bolts, rivets or the like. The right side portion and the left side portion may each include a portion that is disposed forward of the upper cross portion or the lower cross portion in the front-and-rear direction of the vehicle body frame and a portion that is disposed rearward of the upper cross portion or the lower cross portion in the front-and-rear direction of the vehicle body frame. The upper cross portion or the lower cross portion may be disposed between the portions that are disposed at the front of the right side portion and the left side portion and the portions that are disposed at the rear of the right side portion and the left side portion.

At least the displacement X1 and the displacement X2 that result when the forces that are equal or substantially equal in magnitude and direction are exerted on the bearings of the cross portion should be equal or substantially equal to each other, and at least the displacement X3 and the displacement X4 that result when the forces that are equal or substantially equal in magnitude and direction are exerted on the bearings of the cross portion should be equal or substantially equal to each other. A displacement of the cross portion that results when a forward test force in relation to the direction of the rotational axis of the bearing is exerted on the bearing may be different from a displacement of the cross portion that results when a rearward force in relation to the direction of the rotational axis of the bearing that is equal or substantially equal in magnitude as the test force is exerted on the bearing. A displacement of the cross portion that results when a forward test force in relation to the direction of the rotational axis of the bearing is exerted on the bearing may be equal or substantially equal to a displacement of the cross portion that results when a rearward force in relation to the direction of the rotational axis of the bearing that is equal or substantially equal in magnitude as the test force is exerted on the bearing.

It has already been described in the preferred embodiments above that there may be a situation in which the displacement X1 is larger than twice the displacement X3 and the displacement X2 is larger than twice the displacement X4. However, in the present invention, the displacement X1 should be different from the displacement X3, and the displacement X2 should be different from the displacement X4. Therefore, the present invention is not limited to the fact that the displacement X1 is larger than twice the displacement X3 and the displacement X2 is larger than twice the displacement X4. For example, the displacement X1 is larger than the displacement X3, and the displacement X1 may be equal to or smaller than twice the displacement X3. The displacement X2 is larger than the displacement X4, and the displacement X2 may be equal to or smaller than twice the displacement X4. In addition, for example, the displacement X3 may be larger than twice the displacement X1, and the displacement X4 may be larger than twice the displacement X2. In addition, the displacement X3 is larger than the displacement X1, and the displacement X3 may be equal to or smaller than twice the displacement X1. In addition, the displacement X4 is larger than the displacement X2, and the displacement X4 may be equal to or smaller than twice the displacement X2.

When referred to in the present invention, the description reading "the shape looks different" indicates that the shape of a certain portion looks different when the portion is seen in such a state that it is mounted on the vehicle. For example, the shape of a rectangular parallelepiped standing alone is construed as being different from the shape of the same rectangular parallelepiped when it is mounted on the vehicle with its posture turned through 90 degrees.

In the preferred embodiments described above, the right side portion 54, the left side portion 53, and the headstock 211 are provided in positions that are superposed one on another when the vehicle body frame 21 is seen from a side thereof. However, when the vehicle body frame 21 is seen from the side thereof, the headstock 211 may be provided in a different position from positions where the right side portion 54 and the left side portion 53 are provided in relation to the front-and-rear direction. Additionally, leaning angles of the right side portion 54 and the left side portion 53 in relation to the up-and-down direction of the vehicle body frame 21 may differ from a leaning angle of the headstock 211.

The vehicle according to various preferred embodiments of the present invention is a vehicle that includes the vehicle body frame 21 that can lean and two front wheels 31, 32. The number of rear wheels is not limited to one, and hence, the vehicle may include two rear wheels. Whether or not the vehicle includes the body cover that covers the vehicle body frame 21 does not matter. As to the power source, an electric motor may be used in place of the engine.

When referred to in relation to the "direction" and the "member" in the present invention, the term "along" includes a case where the direction and the member are inclined within the range of about ±40 degrees, for example. When referred to in the present invention, that a certain member "extends" in a certain "direction" includes a case where the certain member extents in an inclined direction within a range of about ±40 degrees, for example, from the certain direction.

The upper middle axis M1 and the lower middle axis M4 may be referred to as a middle axis as a general term therefor. The upper cross portion 51 and the lower cross portion 52 may be referred to as a cross portion as a general term therefor. The right side portion 54 and the left side portion 53 may be referred to as a side portion as a general term therefor.

In a preferred embodiment of the present invention, the link mechanism 5 may further include a cross portion in addition to the upper cross portion 51 and the lower cross portion 52. The upper cross portion 51 and the lower cross portion 52 are so called only from their relative positional relationship in the up-and-down direction. The upper cross portion 51 does not imply an uppermost cross portion in the link mechanism 5. The upper cross portion may indicate a cross portion that is positioned lower than an uppermost cross portion but is positioned higher than a different cross portion. The lower cross portion does not imply a lowermost cross portion in the link mechanism. The lower cross portion may indicate a cross portion that is positioned higher than a lowermost cross portion but is positioned lower than a different cross portion. In addition, the cross portion may include three portions including a middle portion that is supported on the vehicle body frame, a right portion that supports the right side portion, and a left portion that supports the left side portion and a right cross portion and a left cross portion that are divided laterally in the left-and-right direction. In this manner, the upper cross portion and the lower cross portion may each include a plurality of portion as long as they still provide the link function. The link mechanism only has to include the upper portion and the lower portion.

Additionally, in the preferred embodiments described above, while the lower cross portion 52 is described as including two portions that are the flat plate-shaped rear lower cross portion 52a2 and the portion that includes integrally the flat plate-shaped front lower cross portion 52a1 and the connecting portions 52b that connects the portion 52a1 and the rear lower cross portion 52a2 together. For example, by preparing the flat plate-shaped rear lower cross portion 52a2, the flat plate-shaped front lower cross portion 52a1, and the two connecting portions 52b as four independent portions, the lower cross portion 52 may include these four portions.

When exerting the test forces, it is preferable that the test forces are exerted in such a state that the vehicle is fixed in the upright state. The forward direction in relation to the direction of the upper right axis indicates a direction that is parallel or substantially parallel to the upper right axis and that is directed from the rear portion to the front portion of the vehicle. The rearward direction in relation to the direction of the upper right axis indicates a direction that is parallel or substantially parallel to the upper right axis and that is directed from the front portion to the rear portion of the vehicle. The upper right axis, the lower right axis, the upper left axis, and the lower left axis are parallel or substantially parallel to one another. Because of this, the forward direction in relation to the direction of the upper right axis, the forward direction in relation to the direction of the lower right axis, the forward direction in relation to the upper left axis, and the forward direction in relation to the lower left axis are the same or substantially the same in direction. The rearward direction in relation to the direction of the upper right axis, the rearward direction in relation to the direction of the lower right axis, the rearward direction in relation to the upper left axis, and the rearward direction in relation to the lower left axis are the same or substantially the same in direction.

The test forces may be exerted directly on the bearings. Additionally, forces may be exerted directly to the side portion, as a result of which the test forces are eventually exerted on the bearings. The test force exerting method is not limited to these methods, as long as a method enables the test forces to be exerted on the bearings. The test forces may be exerted on the bearings by way of the portion other than the side portion.

The terms and expressions that are used herein are used to describe the preferred embodiments of the present invention and hence should not be construed as limiting the scope of the present invention. It should be understood that any equivalents to the characteristic matters that are shown and described herein should not be excluded and that various modifications made within the scope of claims to be made later are permitted.

The present invention can be embodied in many different forms. The disclosure herein should be recognized as providing the preferred embodiments of the principle of the present invention. Based on the understanding that the preferred embodiments that are described and/or illustrated herein are not intended to limit the present invention thereto, several preferred embodiments are described and illustrated herein.

Several illustrated preferred embodiments of the present invention are described herein. The present invention is not limited to the various preferred embodiments that are described herein. The present invention can include every preferred embodiment that includes equivalent elements, modifications, deletions, combinations (for example, combinations of the characteristics of the various preferred embodiments), improvements and/or alterations that those skilled in the art to which the present invention pertains can think of. Matters limited by claims should be construed widely based on terms that are used in the claims and should not be limited to the preferred embodiments described in this description or the prosecution of this patent application. Those preferred embodiments should be construed as non-exclusive. For example, in this disclosure, such terms as "preferred," "preferable" and "good" are non-exclusive terms and mean that "it is preferred but does not limit the present invention," "it is preferable but does not limit the present invention thereto" and "it is good but does not limit the present invention thereto," respectively.

This patent application claims priority to Japanese Patent Application No. 2012-277219 filed on Dec. 19, 2012 and Japanese Patent Application No. 2012-277220 filed on Dec. 19, 2012, the entire contents of which are incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle that is driven by power from a power source, the vehicle comprising:
   a vehicle body frame;
   a left front wheel and a right front wheel disposed in a left-and-right direction as seen from a front of the vehicle and that are steerable;
      a right shock absorbing device that supports the right front wheel at a lower portion thereof and is configured to absorb an upward displacement of the right front wheel in an up-and-down direction of the vehicle body frame;
      a left shock absorbing device that supports the left front wheel at a lower portion thereof and is configured to absorb an upward displacement of the left front wheel in the up-and-down direction of the vehicle body frame;
      a link mechanism including:
         a right side portion that supports an upper portion of the right shock absorbing device so as to turn about a right steering axis that extends in the up-and-down direction of the vehicle body frame;
         a left side portion that supports an upper portion of the left shock absorbing device so as to turn about a left steering axis that is parallel or substantially parallel to the right steering axis;
         an upper cross portion that includes a right end portion that supports an upper portion of the right side portion so as to turn about an upper right axis that extends in a front-and-rear direction of the vehicle body frame via an upper right bearing, a left end portion that supports an upper portion of the left side portion so as to turn about an upper left axis that is parallel or substantially parallel to the upper right axis via an upper left bearing, and a middle portion that is supported on the vehicle body frame so as to turn about an upper middle axis that is parallel or substantially parallel to the upper right axis and the upper left axis via an upper middle bearing; and
         a lower cross portion that includes a right end portion that supports a lower portion of the right side portion so as to turn about a lower right axis that is parallel or substantially parallel to the upper right axis via a lower right bearing, a left end portion that supports a lower portion of the left side portion so as to turn abut a lower left axis that is parallel or substantially parallel to the upper left axis via a lower left bearing, and a middle portion that is supported on the vehicle body frame so as to turn about a lower middle axis that is parallel or substantially parallel to the upper middle axis via a lower middle bearing;
   a steering shaft supported on the vehicle body frame between the right side portion and the left side portion in a left-and-right direction of the vehicle body frame, and including an upper end portion higher in the up-and-down direction of the vehicle body frame than the lower middle axis and that is turnable about a middle steering axis that extends in the up-and-down direction of the vehicle body frame;
   a handlebar provided at the upper end portion of the steering shaft; and
   a turn transfer mechanism configured to transfer a turning motion of the steering shaft according to an operation of the handlebar to the right shock absorbing device and the left shock absorbing device; wherein
      with the lower cross portion removed and the upper cross portion mounted, an upper right displacement of the upper cross portion that results when a forward or rearward test force in relation to the upper right axis is exerted on the upper right bearing and an upper left displacement of the upper cross portion that results when a force that is equal or substantially equal in magnitude and direction as the test force is exerted on the upper left bearing are equal or substantially equal to each other;
      with the upper cross portion removed and the lower cross portion mounted, a lower right displacement of the lower cross portion that results when a force that is equal or substantially equal in magnitude and direction as the test force is exerted on the lower right bearing and a lower left displacement of the lower cross portion that results when a force that is equal or substantially equal in magnitude and direction as the test force is exerted on the lower left bearing are equal or substantially equal to each other;
      the upper right displacement of the upper cross portion and the lower right displacement of the lower cross portion are different from each other;
      the upper left displacement of the upper cross portion and the lower left displacement of the lower cross portion are different from each other; and
      a shape of the upper cross portion and a shape of the lower cross portion are different from each other.

2. The vehicle according to claim 1, wherein the upper right displacement of the upper cross portion is larger than the lower right displacement of the lower cross portion;
   the upper left displacement of the upper cross portion is larger than the lower left displacement of the lower cross portion; and
   the shape of the upper cross portion is smaller than the shape of the lower cross portion.

3. The vehicle according to claim 1, wherein the lower right displacement of the lower cross portion is larger than the upper right displacement of the upper cross portion;
the lower left displacement of the lower cross portion is larger than the upper left displacement of the upper cross portion; and
the shape of the lower cross portion is smaller than the shape of the upper cross portion.

4. The vehicle according to claim 1, wherein a material of the upper cross portion is identical to a material of the lower cross portion.

5. The vehicle according to claim 1, wherein a material of the upper cross portion is different from a material of the lower cross portion.

6. The vehicle according to claim 1, wherein the vehicle body frame includes a link supporting portion configured to turnably support the upper cross portion and the lower cross portion; and
a shape of a front portion of the upper cross portion located farther forward in the direction of the upper right axis than the link supporting portion differs from a shape of a rear portion of the upper cross portion located rearward of the link supporting portion.

7. The vehicle according to claim 1, wherein the vehicle body frame includes a link supporting portion configured to turnably support the upper cross portion and the lower cross portion; and
a shape of a front portion of the lower cross portion located farther forward in the direction of the lower right axis than the link supporting portion differs from a shape of a rear portion of the lower cross portion located rearward of the link supporting portion.

8. The vehicle according to claim 1, wherein the vehicle body frame includes a link supporting portion configured to turnably support the upper cross portion and the lower cross portion; and
the upper cross portion includes:
an upper front portion located farther forward in the direction of the upper right axis than the link supporting portion that is supported at the right end portion, the left end portion, and the middle portion; and
an upper rear portion located farther rearward in the direction of the lower right axis than the link supporting portion and that is supported at the right end portion, the left end portion, and the middle portion.

9. The vehicle according to claim 1, wherein the vehicle body frame includes a link supporting portion configured to turnably support the upper cross portion and the lower cross portion; and
the lower cross portion includes:
a lower front portion located farther forward in the direction of the lower right axis than the link supporting portion and that is supported at the right end portion, the left end portion, and the middle portion; and
a lower rear portion located farther rearward in the direction of the lower right axis than the link supporting portion and that is supported at the right end portion, the left end portion, and the middle portion.

10. The vehicle according to claim 1, wherein the vehicle body frame includes a link supporting portion configured to turnably support the upper cross portion and the lower cross portion; and
the upper cross portion or the lower cross portion is provided only either forward of or rearward of the link supporting portion and is not provided both forward of and rearward of the link supporting portion.

11. The vehicle according to claim 1, wherein a front end of the upper cross portion and a front end of the lower cross portion are provided in different positions in relation to the direction of the upper right axis.

12. The vehicle according to claim 1, wherein a rear end of the upper cross portion and a rear end of the lower cross portion are provided in different positions in relation to the direction of the upper right axis.

13. The vehicle according to claim 1, wherein
the vehicle body frame includes a link supporting portion configured to turnably support the upper cross portion and the lower cross portion; and
the link supporting portion turnably supports the steering shaft.

* * * * *